(12) United States Patent
Harjes et al.

(10) Patent No.: US 9,564,650 B2
(45) Date of Patent: Feb. 7, 2017

(54) METHODS FOR CONTINUOUS DIRECT CARBON FUEL CELL OPERATION WITH A CIRCULATING ELECTROLYTE SLURRY

(75) Inventors: Daniel I. Harjes, Acton, MA (US); D. Andrew Dineen, Jr., Cambridge, MA (US); Liang Guo, Frederick, MD (US); Joseph M. Calo, Greenville, RI (US); Valerie J. Bloomfield, Melrose, MA (US)

(73) Assignees: THE CHARLES STARK DRAPER LABORATORY, INC., Cambridge, MA (US); BROWN UNIVERSITY, Providence, RI (US)

( * ) Notice: Subject to any disclaimer, the term of this patent is extended or adjusted under 35 U.S.C. 154(b) by 1105 days.

(21) Appl. No.: 13/565,376

(22) Filed: Aug. 2, 2012

(65) Prior Publication Data

US 2013/0196238 A1    Aug. 1, 2013

Related U.S. Application Data

(60) Provisional application No. 61/514,393, filed on Aug. 2, 2011.

(51) Int. Cl.
*H01M 2/38* (2006.01)
*H01M 8/06* (2016.01)
(Continued)

(52) U.S. Cl.
CPC ....... *H01M 8/0668* (2013.01); *H01M 8/04276* (2013.01); *H01M 8/04291* (2013.01); *H01M 8/0693* (2013.01); *H01M 8/1233* (2013.01); *H01M 8/143* (2013.01); *H01M 8/145* (2013.01); *H01M 8/146* (2013.01); *H01M 8/225* (2013.01);
(Continued)

(58) Field of Classification Search
CPC ................. H01M 2008/1293; H01M 8/04276; H01M 8/04291; H01M 8/0432; H01M 8/04388; H01M 8/04447; H01M 8/04619; H01M 8/04753; H01M 8/04761; H01M 8/0668; H01M 8/0693; H01M 8/1233; H01M 8/143; H01M 8/145; H01M 8/146; H01M 8/225; Y02E 60/521; Y02E 60/525
See application file for complete search history.

(56) References Cited

U.S. PATENT DOCUMENTS

| 555,511 A | 3/1896 | Jacques |
| 4,080,791 A * | 3/1978 | Nadler ................... F01K 3/185 |
| | | 429/441 |

(Continued)

FOREIGN PATENT DOCUMENTS

| EP | 1724862 A2 * | 11/2005 | .............. H01M 8/00 |
| EP | 1724862 A2 | 11/2006 | |

OTHER PUBLICATIONS

Written Opinion and International Search Report, dated Dec. 13, 2012 for PCT/US12/49336.

(Continued)

*Primary Examiner* — Patrick Ryan
*Assistant Examiner* — Ben Lewis
(74) *Attorney, Agent, or Firm* — Lando & Anastasi, LLP

(57) ABSTRACT

The present invention relates to methods and systems related to fuel cells, and in particular, to direct carbon fuel cells. The methods and systems relate to cleaning and removal of components utilized and produced during operation of the fuel cell, regeneration of components utilized during operation of the fuel cell, and generating power using the fuel cell.

10 Claims, 24 Drawing Sheets

(51) Int. Cl.
  *H01M 8/12*  (2016.01)
  *H01M 8/14*  (2006.01)
  *H01M 8/22*  (2006.01)
  *H01M 8/04*  (2016.01)

(52) U.S. Cl.
  CPC ....... *H01M 8/0432* (2013.01); *H01M 8/04388* (2013.01); *H01M 8/04447* (2013.01); *H01M 8/04619* (2013.01); *H01M 8/04753* (2013.01); *H01M 8/04761* (2013.01); *H01M 2008/1293* (2013.01); *Y02E 60/521* (2013.01); *Y02E 60/525* (2013.01)

(56) References Cited

U.S. PATENT DOCUMENTS

| | | | |
|---|---|---|---|
| 5,376,469 | A | 12/1994 | Gur et al. |
| 6,200,697 | B1 | 3/2001 | Pesavento |
| 6,692,861 | B2 | 2/2004 | Tao |
| 7,438,987 | B2* | 10/2008 | Cooper ............... H01M 8/0612 429/523 |
| 7,678,484 | B2 | 3/2010 | Tao et al. |
| 7,745,064 | B2 | 6/2010 | Blake et al. |
| 7,749,633 | B2* | 7/2010 | Larrain ............. H01M 8/04186 222/206 |
| 7,943,270 | B2 | 5/2011 | Blake et al. |
| 7,943,271 | B2 | 5/2011 | Tao et al. |
| 7,981,563 | B2 | 7/2011 | Ong et al. |
| 2006/0257702 | A1* | 11/2006 | Gur .................... H01M 8/0643 429/410 |
| 2008/0171257 | A1* | 7/2008 | Patel .................. H01M 8/2475 429/414 |
| 2009/0075128 | A1* | 3/2009 | Sadamoto .......... H01M 8/0202 429/410 |
| 2009/0117429 | A1 | 5/2009 | Zillmer et al. |
| 2011/0014526 | A1 | 1/2011 | Gur |

OTHER PUBLICATIONS

Cao et al., "Direct carbon fuel cell: Fundamentals and recent developments," Journal of Power Sources, 2007, vol. 167, pp. 250-257.

Hemmes et al., "A Theoretical Study of the Carbon/Carbonate/Hydroxide (Electro-) Chemical System in a Direct Carbon Fuel Cell," The 2nd International Conference on Fuel Cell Science, Engineering and Technology, 2004, pp. 1-6, Rochester, NY.

Kling, "The Rate of Carbonate Formation in a Direct Carbon Fuel Cell," Unpublished West Virginia University Report, 2008, 9 pages.

Kouchachvili et al., "Performance of Direct Carbon Fuel Cell," International Journal of Hydrogen Energy, Accepted Oct. 12, 2010, vol. 26, pp. 10263-10268.

Patton et al., "Direct Carbon Fuel Cell with Stable Molten Hydroxide Catholyte," The 4th International Conference on Fuel Cell Science, Engineering and Technology, Jun. 19-21, 2006, pp. 1-3, Irvine, CA.

Zecevic et al., "Direct Carbon Fuel Cell with Hydroxide Electrolyte-Cell Performance During Initial Stage of a Long Term Operation," The Third International Conference on Fuel Cell Science, Engineering and Technology, 2005, pp. 1-8, Ypsilanti, MI.

* cited by examiner

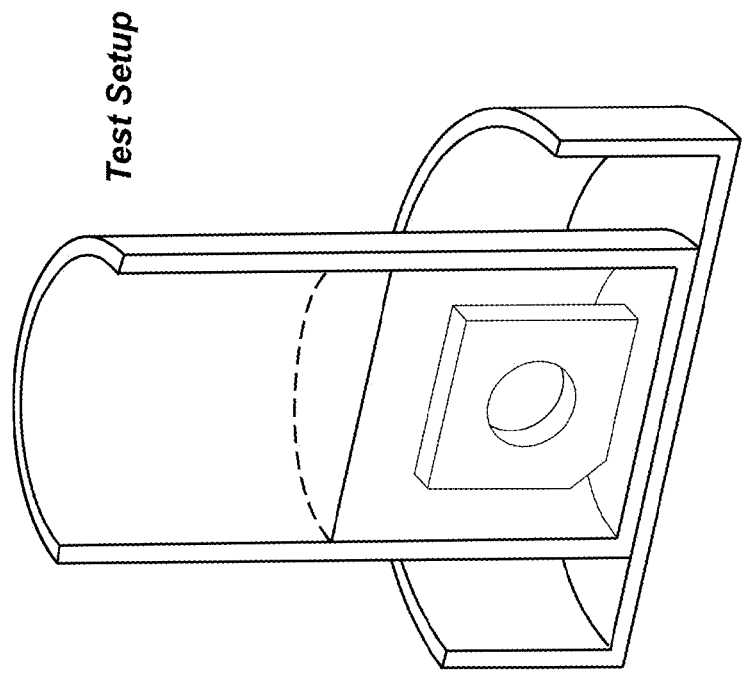
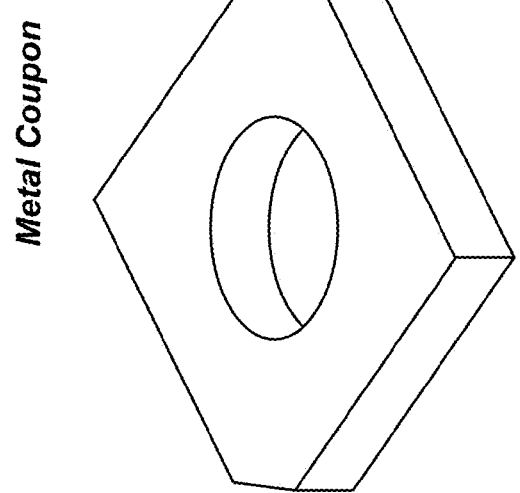
FIG. 24

METHODS FOR CONTINUOUS DIRECT CARBON FUEL CELL OPERATION WITH A CIRCULATING ELECTROLYTE SLURRY

CROSS-REFERENCE TO RELATED APPLICATION

This application claims priority under 35 U.S.C. §119(e) to U.S. Provisional Application Ser. No. 61/514,393 titled, "METHODS FOR CONTINUOUS DIRECT CARBON FUEL CELL OPERATION WITH A CIRCULATING ELECTROLYTE SLURRY," filed Aug. 2, 2011, the disclosure of which is hereby incorporated by reference in its entirety.

FEDERALLY SPONSORED RESEARCH

This invention was made with government support under Grant No. DE-SC0001556 awarded by the Department of Energy. The U.S. Government has certain rights in this invention.

FIELD OF THE TECHNOLOGY

Aspects relate generally to direct carbon fuel cell systems. Further aspects relate generally to systems and methods comprising the direct carbon fuel cell systems with circulating electrolyte slurry.

SUMMARY

One or more aspects of the present disclosure involve embodiments directed to a method of cleaning a direct carbon fuel cell chamber. The direct carbon fuel cell chamber may comprise an at least partially expended carbon-electrolyte slurry. The method may comprise introducing a carbon and an electrolyte into a mixing tank to generate a carbon-electrolyte slurry. The method may also comprise introducing the carbon-electrolyte slurry at a first flow rate into the direct carbon fuel cell chamber through a first channel when the carbon-electrolyte slurry reaches a predetermined level in the mixing tank. The method may further comprise removing an at least partially expended carbon-electrolyte slurry from the direct carbon fuel cell chamber at a second flow rate through a second channel when the at least partially expended carbon-electrolyte slurry reaches a predetermined level in the chamber, wherein the first flow rate is slower than the second flow rate.

In at least one aspect, the method further comprises controlling the first flow rate by allowing a fluid level in the first channel to reach a predetermined level at a height greater than the predetermined level in the mixing tank. In certain aspects, the method further comprises controlling the first flow rate by providing a first cross-sectional area at a predetermined value to the first channel. In some aspects, the method further comprises using gravity to introduce the carbon-electrolyte slurry into the direct carbon fuel cell chamber. In another aspect, the method further comprises controlling the second flow rate by allowing a fluid level in the second channel to reach a predetermined level at a height greater than the predetermined level in the direct carbon fuel cell chamber. In certain aspects the method further comprises controlling the second flow rate by providing a second cross-sectional area at a predetermined value to the first channel. In other aspects, the method further comprises controlling the first and second flow rates by providing the first channel with a first cross-sectional area and the second channel with a second cross-sectional area, the first cross-section area at a value that is smaller than the second cross-sectional area. In at least one aspect, the method further comprises introducing the at least partially expended carbon-electrolyte slurry from the second channel into a cleaning system to produce recycled electrolyte. In some aspects, the method further comprises using gravity to introduce the at least partially expended carbon-electrolyte slurry into the cleaning system. In certain aspects, the method further comprises introducing at least a portion of the recycled electrolyte into the mixing tank.

One or more aspects of the present disclosure are directed to a method of removing at least one undesirable component from an anode compartment of a direct carbon fuel cell system. The anode compartment may comprise a chamber inlet, a chamber outlet, an exhaust outlet, and at least two compartments arranged in series, each compartment having a compartment inlet and a compartment outlet, each compartment comprising a gas lift port fluidly connected to a source of a lift gas. The method may comprise introducing a carbon and an electrolyte to the chamber inlet. The method may also comprise introducing a lift gas from the source of lift gas through the gas lift port of at least one compartment. The method may also comprise removing at least one of carbon dioxide and the lift gas through the exhaust outlet, and removing an expended slurry through the chamber outlet.

In one or more embodiments, the method further comprises introducing the feed slurry through the series of compartments in a tortuous flow path. In certain embodiments, the method further comprises reacting at least a portion of the feed slurry in each compartment to produce a series of reaction mixtures, each reaction mixture possessing a ratio of expended slurry to feed slurry, the ratio in each reaction mixture increasing as the slurry flows from the first compartment to the last compartment until the ratio reaches a predetermined value. In another embodiment, the method further comprises controlling a concentration gradient of the carbon and the electrolyte in each compartment by inducing vertical flow of the lift gas from the gas lift ports at predetermined flow rates. In some embodiments, the method further comprises controlling a flow rate of slurry through the chamber by providing feed slurry having a predetermined concentration of at least one of the carbon and the electrolyte. In certain aspects, the method further comprises controlling a flow rate of slurry through each compartment by inducing vertical flow of the lift gas from at least one of the gas lift ports at a predetermined flow rate. In at least one aspect, the method further comprises introducing the expended slurry to a cleaning process to produce recycled electrolyte. In certain embodiments, the method further comprises introducing at least a portion of the recycled electrolyte to the feed slurry.

In one or more embodiments, the cleaning process comprises introducing the expended slurry into a chamber maintained at a temperature to produce vaporized electrolyte and condensing the vaporized electrolyte to produce a recycled electrolyte. In certain embodiments, the cleaning process comprises separating electrolyte from the expended slurry by solubilizing the electrolyte at a predetermined temperature to produce a dissolved electrolyte solution, precipitating the dissolved electrolyte solution to form an electrolyte precipitate, and separating the electrolyte precipitate from the dissolved electrolyte solution to form a recycled electrolyte.

In accordance with one or more embodiments, a system for generating power in a direct carbon fuel cell system is provided. The system comprises a source of carbon and a pyrolyzer fluidly connected downstream of the source of carbon. The system also comprises a source of an electrolyte and a slurry tank fluidly connected downstream of the pyrolyzer and the source of electrolyte. The system also comprises at least one direct carbon fuel cell fluidly connected downstream of the slurry tank and comprising a lift gas inlet. The system also comprises a source of lift gas fluidly connected to the lift gas inlet, and a cleaning system fluidly connected downstream of the direct carbon fuel cell and fluidly connected upstream of the slurry tank. In certain embodiments, the electrolyte is selected from the group consisting of alkali hydroxides, eutectics, and carbonates.

In accordance with one or more embodiments, a method of generating electrochemical power from a direct carbon fuel cell is provided. The method comprises introducing a fuel comprising a carbon and an electrolyte to a chamber of the direct carbon fuel cell and suspending at least a portion of the fuel in the chamber. The method also comprises reacting at least a portion of the carbon and the electrolyte in the chamber to generate electrochemical power, expended fuel, and carbon dioxide. The method also comprises removing expended fuel from an outlet of the chamber and removing carbon dioxide through an exhaust outlet of the chamber.

In certain embodiments, the method further comprises introducing the expended fuel to a cleaning process to produce recycled electrolyte. In another embodiment, the method further comprises introducing at least a portion of the recycled electrolyte to the fuel. In certain embodiments, the system is constructed and arranged to operate at an efficiency level of at least 50% and produce at least 20 kW of electrochemical power. In at least one embodiment, the method further comprises maintaining the efficiency level of at least 50% while substantially reducing the amount of electrochemical power produced. In some embodiments, the method further comprises connecting the direct carbon fuel cell to a power grid to supply electrochemical power.

BRIEF DESCRIPTION OF THE DRAWINGS

The accompanying drawings are not intended to be drawn to scale. For purposes of clarity, not every component may be labeled in the drawing, nor is every component of each embodiment of the invention shown where illustration is not necessary to allow those of ordinary skill in the art to understand the invention. In the drawings:

FIG. 24 is an illustration of a test coupon and crucible pertinent to one or more aspects of the disclosure.

DETAILED DESCRIPTION

Figure 1:
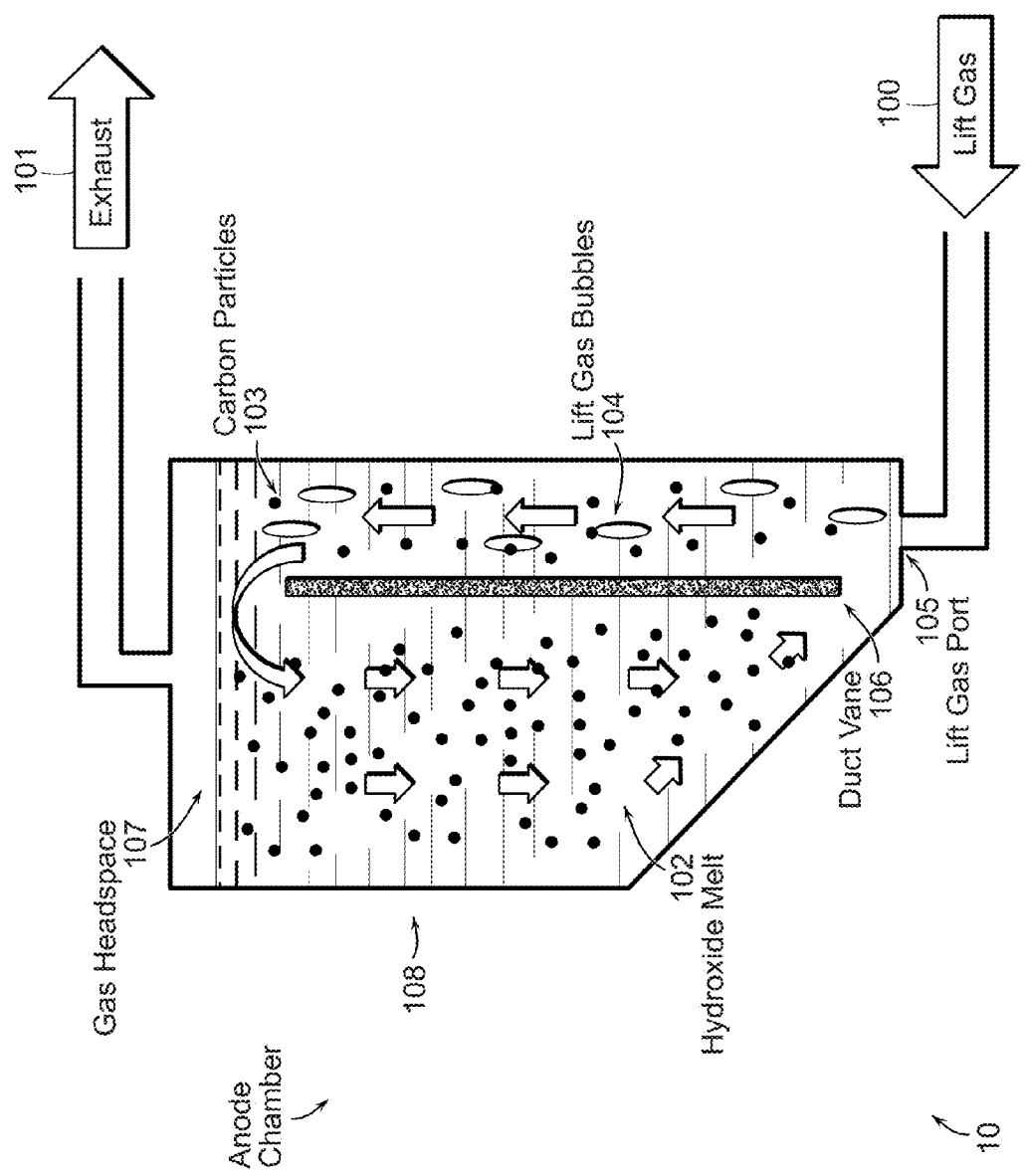
FIG. 1 is a circulation diagram pertinent to one or more aspects of the disclosure.

The present invention is directed to electrochemical devices, with particular use in fuel cells. A fuel cell is a device that converts fuel to electrical energy electrochemically, that is, without combustion of the fuel (although a fuel cell could be used in conjunction with a device deriving energy from combustion of the same fuel; most fuel cells do not). A typical, conventional fuel cell includes two electrodes, an anode and a cathode, an electrolyte in contact with both the anode and cathode, and an electrical circuit connecting the anode and the cathode from which power created by the device is drawn. In typical operation, an oxidant (e.g., oxygen, or simply air) is provided to the cathode where it is chemically reduced, e.g., to an oxygen ion, which is delivered to the anode via the electrolyte. Fuel, such as hydrogen, a hydrocarbon, and/or a carbonaceous fuel, is supplied to the anode where it reacts with the oxygen ion to form water and/or carbon dioxide, and the reaction releases electrons as the fuel is oxidized. The electrons are removed from the anode by a current collector, or other component of an electrical circuit. The overall reaction is energetically favorable, i.e., the reaction gives up energy in the form of energetic or power driving electrons from the anode, through electrical circuitry, to the cathode. This energy can be captured for essentially any purpose.

A Direct Carbon Fuel Cell (DCFC) generates power by electrochemically reacting carbon and oxygen to produce carbon dioxide ($CO_2$) and generate electrical power. A DCFC is made up of an anode where carbon oxidation takes place and a cathode where oxygen reduction takes place. The reaction equations are represented below:

Anode: $C + 4(OH)^- \rightarrow 2H_2O + CO_2 + 4e^-$

Cathode: $O_2 + 2H_2O + 4e^- \rightarrow 4(OH)^-$

Overall Reaction: $C + O_2 = CO_2$

The process is electrochemical and therefore is not limited by the thermodynamic efficiency limitations of a typical heat engine (Carnot Cycle). A DCFC system may operate at an efficiency of approximately 60% of the heating value of graphite. Traditional coal fired power plants only achieve approximately 20-33% higher heating value (HHV) efficiency under optimal conditions. Thus, a DCFC may produce power at half the fuel cost and $CO_2$ emissions of current technology. In addition, it is possible for DCFCs to operate using any carbon-rich solid fuel source. Applications are extensive, including large scale power generation, remote power generation, for example, in a forward military operating base, and even waste disposal.

The first recorded claim of DCFC technology dates back to 1894 in Jacques, "Method of Converting Potential Energy of Carbon into Electrical Energy" U.S. Pat. No. 555,511, Mar. 3, 1896. Since then, several research institutions and corporations have experimented with various embodiments of DCFC designs. While these proof-of-concept systems have demonstrated feasibility, none have proven continuous, long term, operation (>500 hrs) for a variety of reasons.

Existing DCFC systems are essentially "batch processes." In these batch processes, the cell is initially charged with a quantity of fuel and electrolyte. The fuel is consumed over time and once depleted, it is necessary to cease operation of the fuel cell and remove the contents of the fuel cell, including the fuel and electrolyte. Once the contents of the fuel cell are removed, the fuel cell must be recharged with fuel and electrolyte. In a batch process, there is no continuous removal and recharging of the fuel cell during operation of the cell. Batch processes also suffer from several other issues. For example, during operation, the fuel is consumed and the electrolyte becomes contaminated from impurities in the fuel and from other sources. This reduces the reactivity and conductivity of the system, which in turn reduces the power output. Down time is necessary between batch operations to cool the fuel cell down and replace the components including the fuel source and the electrolyte. Typically, this may take days, which may make the batch process unfeasible for many applications. The electrodes may also become fouled over the duration of the batch process from ash deposits or sulfur that are generated from the fuel source. Complete fuel utilization may also be lacking due to inefficiencies in the system. In addition, the used electrolyte must be wasted, and cannot be reused in the process. These issues have prevented long term operation of DCFCs.

The present disclosure describes a DCFC system that may operate for extended periods of time using a continuous feed of carbon-based fuel. Continuous, reliable operation may provide a commercially viable DCFC based power generation system. This may be accomplished through utilization of at least one of several features described in this disclosure.

The DCFC system of the present disclosure does not suffer from "batch process" limitations. "Batch processes" include those processes in which a fuel cell is initially charged with a quantity of fuel and electrolyte. The fuel is consumed over time and once depleted, the cell ceases to operate and must be cleaned and recharged with fuel and, typically, electrolyte. The issues associated with batch process DCFCs have prevented long-term operation and success of DCFCs.

The present disclosure may ensure that the fuel cell can operate at constant power for extended durations without encountering issues such as fuel depletion, electrolyte contamination, reduction in reactivity and conductivity of the cell, reduction in power output, and reduction or complete elimination of down time.

In certain embodiments of the present disclosure, a hydrodynamically driven, continuous flow DCFC system is provided. The system may be used for long term and reliable operation. Systems that are "hydrodynamically" driven or systems that involve "hydrodynamic circulation or flow" may include those systems that are at least partially driven by means of a fluid in motion. The DCFC system may be operated reliably, with inefficiencies approaching zero or acceptable values. In these embodiments, solid carbon fuel and oxygen may be continuously fed to the system, and primarily $CO_2$ and solid ash may be removed as waste products.

In accordance with one or more embodiments, the system may utilize various types of carbon fuel sources, including solid carbon fuel sources. As used herein, the term "carbon" may refer to any carbon-containing material or combination of materials that may be suitable for use in the DCFC systems described herein. The term includes solid fraction particulates of carbon including amorphous carbon, coke and soot, as well as carbonaceous gums, resins and other deposits. Examples of carbon-containing material include conductive carbon, graphite, quasi-graphite, coal, including bituminous coals, charcoal, fullerene, buckminsterfullerene, carbon black, activated carbon, and decolorizing carbon, lignite. For example, the DCFC system may use a pulverized carbon fuel source, which may be derived from a number of non-limiting sources, including coal, petroleum coke, biomass, plastics, and organic waste.

In certain embodiments, the system may utilize various types of electrolytes that allow for the desired reaction to occur with the carbon fuel source. For example, some embodiments of the present disclosure may use one or more alkali hydroxides as an electrolyte. In certain aspects, the electrolyte may comprise molten hydroxide electrolyte, such as sodium hydroxide, potassium hydroxide, lithium hydroxide, and combinations thereof. The same or similar operating techniques may be applied to other electrolytes, such as molten carbonates and cryolites. Other types of electrolytes that may also be used include solid oxide electrolytes. A further type of electrolyte suitable for certain aspects disclosed herein may include a eutectic. As used herein, the term "eutectic" refers to a mixture of chemical compounds of elements that possess a single chemical composition that solidifies at a lower temperature than any other composition made up of the same ingredients. For example, a eutectic may include a hydroxide mix of sodium, potassium, and lithium. Another example of a eutectic may include a carbonate mixture of sodium and potassium.

In certain embodiments of the present disclosure, hydrodynamic circulation may be used to maintain at least one of the fuel and the electrolyte in suspension, promote mixing of fuel with the electrolyte, and promote contact of the fuel with the electrode surface of the anode chamber of the fuel cell.

In certain applications, during operation of the fuel cell, a carbon source such as a particulate carbon, and an electrolyte, such as a molten electrolyte, are fed into the fuel cell in the form of a slurry. An inert lift gas, such as nitrogen or steam, may be purged into the base of the anode chamber, imparting momentum to the slurry, and thereby inducing circulatory flow that transports carbon particles to the anode surface to undergo oxidation. The hydrodynamic flow also prevents ash buildup on electrode surfaces.

FIG. 1 illustrates an anode chamber 10 of a DCFC according to one or more embodiments of the methods and systems described herein. FIG. 1 is a side view of a rectangular anode compartment 108, partially filled with electrolyte slurry. It should be noted that in reality, the slurry may be a much denser mixture of carbon particles than as depicted in the illustration. A slurry of carbon particles 103 and electrolyte 102, such as hydroxide melt electrolyte, is contained with and may be added to the fuel cell as desired or needed. Lift gas 100 is injected through the base of anode compartment 108 through a lift gas port. The lift gas injected through the lift gas port creates lift gas bubbles 104 within anode compartment 108 and causes movement of the slurry in the direction of arrows as shown to maintain suspension of the slurry in the chamber. This allows the carbon particles to come into contact with and react with the anode in the anode chamber and produce carbon dioxide. A duct vane 106 or baffle may be included in anode compartment 108 to assist in movement and circulation of the slurry. Variations on this configuration may be utilized, including varying the number, dimensions, and angles of the one or more baffles or duct vanes within the compartment.

Gas headspace 107 is positioned near the top of anode compartment 108. Lift gas bubbles 104 that are processed through the anode chamber may be removed from the chamber by way of the exhaust 101. The carbon dioxide that is produced through the reaction of the carbon fuel may also be removed from the chamber by way of the exhaust.

Figure 2:
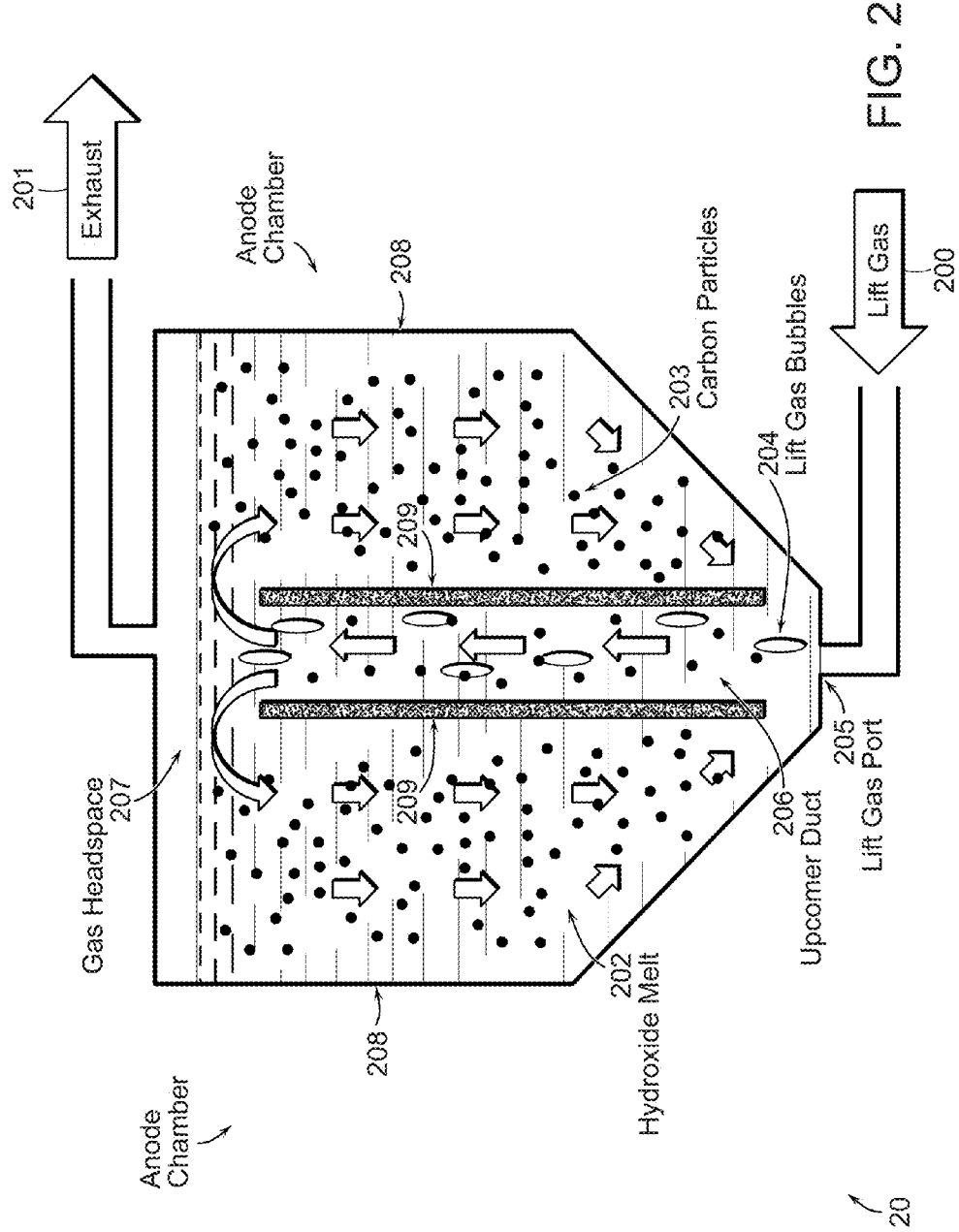
FIG. 2 is a circulation diagram pertinent to one or more aspects of the disclosure.

In another embodiment, as shown in FIG. 2, an illustration of a symmetric design 20 is provided in which a central draft duct 206 feeds two symmetric anode chambers 208 located on either side. This illustration shows two duct vanes 209 or baffles that are centered in the anode chambers 208 of the DCFC. Lift gas port 205 is also positioned in the center between baffles 209. This may allow lift gas 200 to enter the base of the chamber through lift gas port 205 and move upward through the baffles, around the top edge of the baffles and down through the outer sections of the chamber, as shown with the arrows in FIG. 2. This configuration may allow for suspension of carbon fuel 203 and hydroxide melt electrolyte 202.

Gas headspace 207 may be positioned near the top of chambers 208. Lift gas bubbles 204 that are processed through anode chambers 208 are removed from the chamber by way of exhaust 201. The carbon dioxide that is produced through the reaction of the carbon fuel is also removed from the chamber by way of the exhaust.

In alternative embodiments, the lift gas port may be positioned at one or more other locations in the chamber. For example, the lift gas port may be positioned at or near the middle of the anode chamber, or at or near the top portion of the anode chamber. In certain embodiments, the hydrodynamic circulation may also be run in reverse, downwards in the draft duct and upwards in the anode chamber, for example, in conditions where the fuel particles are buoyant (for example, less dense than the molten electrolyte). The delivery of the gas through the port may be performed in a continuous manner, or may be provided in a non-continuous manner. For example, the gas lift port may be constructed and arranged to provide for a pulsed flow of gas to the fuel cell. Alternatively, the source of gas may be provided through the port in a pulsed flow to the fuel cell. The pulsed flow may be provided at regular intervals or in a consistent pattern, or may be provided in an irregular pattern. The gas flow may be provided on a timer or may be provided based on a measurement of a parameter of the system. A parameter of the system may include, for example, temperature, flow rate, concentration of carbon fuel, concentration of electrolyte, carbon dioxide production, and power output, or other parameters of the system known to a person of ordinary skill in the art.

In certain aspects, mixing of the cell contents induced by hydrodynamic circulation of the electrolyte slurry also maintains the operating temperature constant at steady-state, thereby facilitating optimal heat exchange and thermal management.

In certain aspects, the rectangular geometry of the designs of this disclosure may facilitate "stacking" of the cells to allow two or more cells proximate to one another in a consolidated manner. This may allow for production of higher voltages. In the configurations shown in FIGS. 1 and 2, one plane (front or back) is the anode and the other is a current collector/feeder to the next contiguous "stacked" cell.

The electrochemical devices according to the present invention may also have a wide variety of geometries including cylindrical, planar and other configurations. An electrochemical device according to the present invention may be combined with additional electrochemical devices to form a larger device or system. In some embodiments this may take the form of a fuel cell stack. Where more than one electrochemical device is combined, the devices may all be devices according to the present invention, or one or more devices according to the present invention may be combined with other electrochemical devices.

The DCFC systems and devices according to the present invention may be constructed from any material that will not destructively interfere with the device or be easily corroded. The components may be constructed of non-reactive materials, that is, materials that do not participate in any electrochemical reaction that may occur in one or more devices present in the overall system.

In another embodiment of the disclosure, a method and system for removing an undesirable component from an anode chamber is provided. As used herein, the term "undesirable component" may refer to any element, compound, or substance contained within the DCFC system that is unwanted or will adversely affect the DCFC process. For example, non-limiting examples of undesirable components may refer to inorganic solids, hydroxides, such as sodium hydroxide, carbonates, such as sodium carbonate, and ash. In certain embodiments, the undesirable component may refer to at least one of ash and contaminated electrolyte. In addition, relatively pure carbon particles generally used in a DCFC may contain some amount of inorganic matter, such as ash, that will not react at the anode. This material may need to be removed in order to prevent or reduce anode contamination and plugging of the slurry flow circuit. Further, the electrolyte melt, or molten hydroxide electrolyte, may also suffer from chemical contamination over time. Molten hydroxide electrolytes are known to have a propensity for carbonate formation under certain DCFC operating conditions. In the current embodiment, carbonate formation in molten hydroxide may be minimized by running at a lower temperature (for example, 550° C.) than what is typically used in a DCFC (for example, 600° C.). In addition, the use of humidified lift gas may also inhibit carbonate formation. In certain aspects, hydrodynamic circulation of the electrolyte slurry may also allow for continuous or semi-continuous removal of contaminated electrolyte for treatment.

Figure 3:
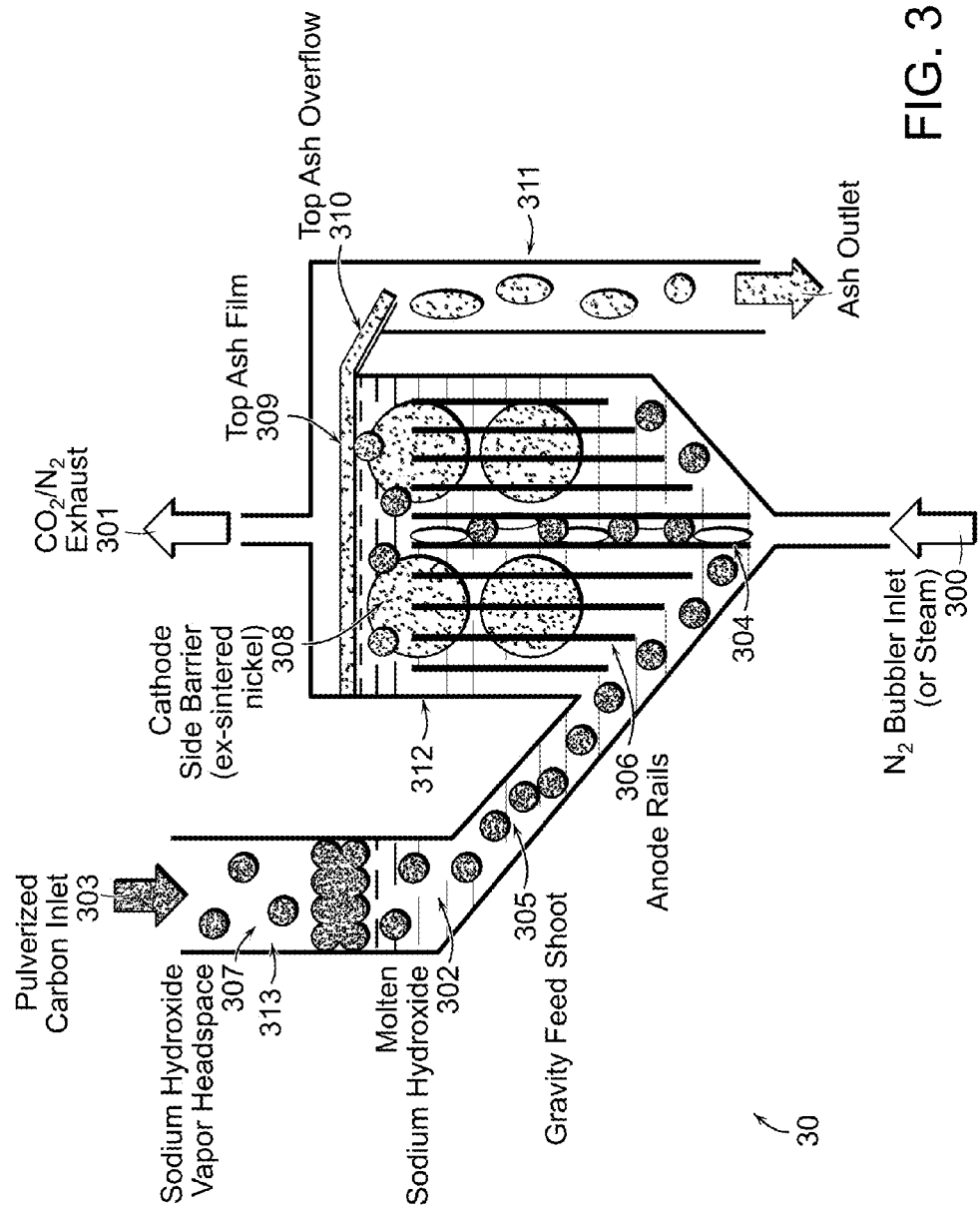
FIG. 3 is a diagram of a circulating cell with a skimmer pertinent to one or more aspects of the disclosure.

Certain aspects of the disclosure may provide for a method and system for a circulating fuel cell with a skimmer. FIG. 3 illustrates a schematic flow diagram of a DCFC using such a system 30. Carbon 303 and electrolyte (not shown) are introduced to the system near the top of a peripheral wetting tank 313. The electrolyte may be added in pellet form with the carbon. As shown in the figure, carbon 303 is directed into tank 312 through peripheral wetting tank 313. Once carbon 303 is wetted and mixed with molten electrolyte 302, it may descend to the bottom of the cell through gravity feed shoot 305 where it is entrained with a circulating slurry. Lift gas 300, for example nitrogen or steam, may be injected through the base of chamber 312. Lift gas 300 creates lift gas bubbles 304 within chamber 312. Lift gas bubbles 304 that are processed through anode chamber 312 may be removed from the chamber by way of exhaust 301. Carbon dioxide that is produced through the reaction of the carbon fuel may also be removed from chamber 312 by way of exhaust 312. Gas headspace 307 may be positioned near carbon inlet. Chamber 312 may also be equipped with one or more anode rails 306. Ash may accumulate at the liquid-gas interface as top ash film 309 since it may be less dense than the electrolyte slurry. The resulting ash layer may overflow through overflow feature 310, or may be actively skimmed, into an exit drip conduit 311 or receptacle for disposal or further processing. Chamber 312 may also comprise a cathode barrier 308. The barrier may be constructed from corrosion resistant material, such as sintered nickel mesh.

Figure 4:
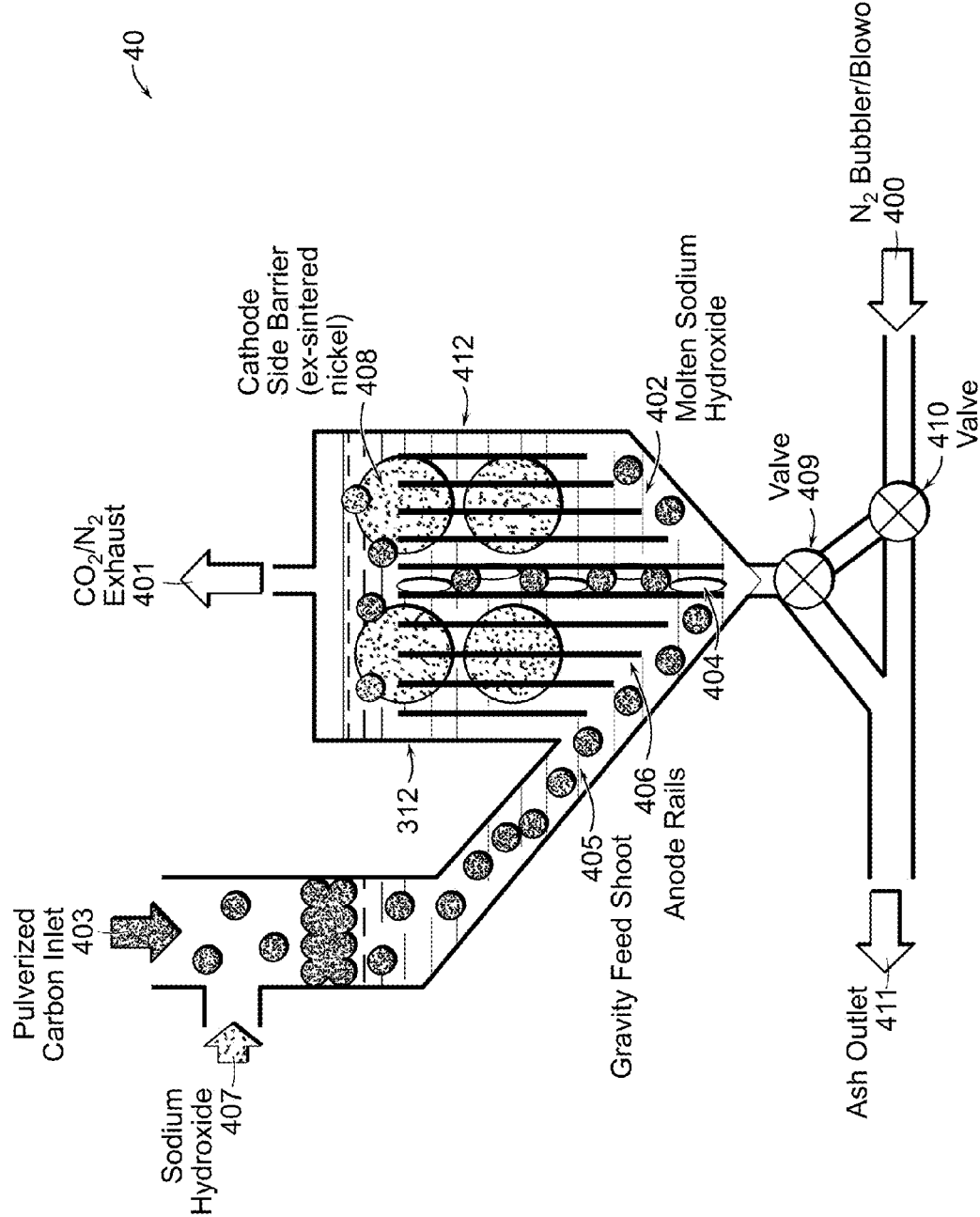
FIG. 4 is a diagram of a circulating cell with a valve purge pertinent to one or more aspects of the disclosure.

Certain aspects of the disclosure may provide a reactor tank that may be periodically purged using valves located at the base of the reactor. The purged slurry may then be cleaned and reintroduced using various techniques. As illustrated in the system 40 of FIG. 4, carbon 403 may be introduced at the carbon inlet in the form of pulverized carbon. Sodium hydroxide 407 or other electrolyte may also be introduced with the carbon or introduced separately. The carbon-electrolyte slurry may be fed to the cell by way of gravity feed shoot 405. Molten electrolyte 402, such as molten sodium hydroxide, present in chamber 412 aids in the reaction process. An inert gas 400 such as nitrogen, or steam may be added to the system by controlling valves 409 and 410 located at the base of chamber 412. Lift gas 400 creates lift gas bubbles 404 within chamber 412. Chamber 412 may also be equipped with one or more anode rails 406 and a cathode barrier 408. Cathode barrier 408 may be constructed from corrosion resistant material, such as sintered nickel mesh. Ash may be removed from the system by controlling valve 409 by flowing through ash outlet 411, while carbon dioxide and inert gas may be removed from the system by way of exhaust 401. Since the entire cell may be purged, the system does not depend on physical properties of the ash. The total purge process may allow for chemical cleaning of the electrolyte.

In certain aspects of the disclosure, a method for cleaning a DCFC chamber is disclosed. In at least one aspect, a method is used for removing at least one of contaminated electrolyte and carbon from a DCFC system. The method may comprise using a channel, such as a siphon, to at least partially purge the anode chamber. At least one configuration utilizing a siphon to purge the anode chamber may be provided in accordance with the systems and methods of the present disclosure. This process may be performed during a period in which the DCFC is not in operation. The method may further comprise providing a mixing tank. A mixing tank may be provided where at least one of recycled electrolyte and fresh electrolyte are combined with carbon to generate carbon-electrolyte slurry. As used herein, the term "fresh" is used to describe a material which has not been previously used in a DCFC process. Carbon and electrolyte may be combined together before being introduced to the mixing tank. In addition, carbon and electrolyte may be added separately to the mixing tank. In certain configurations, the mixing tank is positioned above the anode chamber. At least one of the recycled electrolyte and fresh electrolyte may be introduced to the mixing tank from a source of electrolyte. The carbon fuel may be introduced to the mixing tank from a source of carbon.

In certain embodiments, the carbon-electrolyte slurry may be introduced into the DCFC chamber through a channel. The carbon-electrolyte slurry may be introduced into the DCFC chamber when the carbon-electrolyte slurry reaches a predetermined level in the mixing tank. As used herein, the term "predetermined level" should be construed as encompassing a specified value or a range of values having both of upper and lower limits or a range of values having only one of upper and lower limits. In certain embodiments, the carbon-electrolyte slurry may be introduced at a first flow rate into the DCFC chamber through a channel when the carbon-electrolyte slurry reaches a predetermined level in the mixing tank. The channel may be in the form of a siphon loop. In at least one embodiment, when the slurry level in the mixing tank reaches a first siphon loop, gravity may function to empty the contents of the tank into the anode reactor chamber. A pump or other means of transporting the slurry from the mixing tank to the DCFC chamber may also be used.

The incoming carbon-electrolyte slurry may cause the fluid level in the DCFC chamber to rise. The carbon-electrolyte slurry may react in the chamber to form an at least partially expended carbon-electrolyte slurry. As used herein, the term "at least partially" when used in reference to the carbon-electrolyte slurry, refers to at least some portion of the slurry, including the slurry in its entirety. The at least partially expended carbon-electrolyte slurry may exit the DCFC chamber through a channel. In certain embodiments, the channel may be a siphon loop. In various aspects, the at least partially expended carbon-electrolyte slurry may be removed from the DCFC chamber when the at least partially expended carbon-electrolyte slurry reaches a predetermined level in the DCFC chamber. The at least partially expended carbon-electrolyte slurry may be removed from the DCFC chamber at a second flow rate. In certain instances, when the at least partially expended carbon-electrolyte slurry reaches a predetermined level in the DCFC chamber the partially expended carbon-electrolyte slurry may be removed through the second channel. The removal of the partially expended carbon-electrolyte slurry from the DCFC chamber may be rapid, and occur suddenly. The channel may lead to a collection receptacle, which may further feed into a cleaning system. In at least one embodiment, when the slurry level in the anode reactor chamber reaches its own siphon loop height, gravity may function to empty the contents of the chamber into a collection receptacle. A pump or other means of transporting the expended slurry from the DCFC chamber may also be used.

An "expended" component of the system, such as the carbon-electrolyte slurry in the reactor, carbon fuel, electrolyte, or other component may be defined as a component that may be operating at less than optimal conditions. For example, an at least partially expended carbon fuel may be carbon fuel that has at least partially reacted with the anode of the fuel cell, and can no longer be utilized in the fuel cell system to provide power. Over time, carbon fuel may be expended in the system, which may be indicated by a reduced value in the measurement of the system efficiency.

In certain embodiments, the flow rate through the first channel from the mixing tank into the anode chamber may be slower than the flow rate through the second channel exiting the DCFC chamber. In various aspects, this may be due to the cross sectional area of the first channel being smaller than the second channel. This may assist in preventing carbon-electrolyte from the mixing tank to be flushed through the system too quickly. In certain aspects, a first flow rate through the first channel from the mixing tank to the anode chamber may be controlled by allowing a fluid level in the first channel to reach a predetermined level at a height greater than the predetermined level in the mixing tank. In another aspect, a second flow rate exiting the DCFC chamber may be controlled by allowing a fluid level in the second channel to reach a predetermined level at a height greater than the predetermined level in the DCFC chamber. In other aspects, the first flow rate may be controlled by providing a first cross-sectional area at a predetermined value to the first channel. In certain aspects, the second flow rate may be controlled by providing a second cross-sectional area at a predetermined value to the second channel. In at least one aspect, the first cross-sectional area may be at a value that is smaller than the second cross-sectional area.

Once carbon-electrolyte slurry has entered the reactor tank, the reactor may begin operation and begin to consume the carbon-electrolyte slurry and produce at least partially expended carbon-electrolyte slurry. In certain aspects, at least a portion of the at least partially expended carbon-electrolyte slurry may be introduced into a cleaning system. As used herein, the terms "cleaning system" or "cleaning process" refer to a device or process that is capable of taking expended electrolyte and producing recycled electrolyte. In certain embodiments, the cleaning system may be integrated into one or more DCFC systems or processes. The cleaning system may also exist independently from one or more DCFC processes. The recycled electrolyte is suitable for re-use in the DCFC chamber process. The at least partially expended carbon-electrolyte slurry may be introduced into the cleaning system from the second channel, or may be collected in a collection receptacle. In certain embodiments, the at least partially expended carbon-electrolyte slurry may be introduced into the cleaning system by using gravity. A cleaning system may process the at least partially expended carbon-electrolyte slurry to produce recycled electrolyte. In at least one embodiment, the at least partially expended carbon-electrolyte slurry is drained into the cleaning system. The cleaning system may recycle electrolyte, such as sodium hydroxide electrolyte, to the mixing tank. In certain aspects, at least a portion of the recycled electrolyte is introduced into the mixing tank. The entire process may then be repeated. In this embodiment, no moving parts may be required, and the system may be self regulating. In certain embodiments, multiple DCFC chambers may be constructed and arranged to operate together as a continuous process. This may be accomplished through precise staging and control systems, and may include mechanical components, including one or more common manifolds connected to inlets and exhaust outlets of each chamber.

Figure 5:
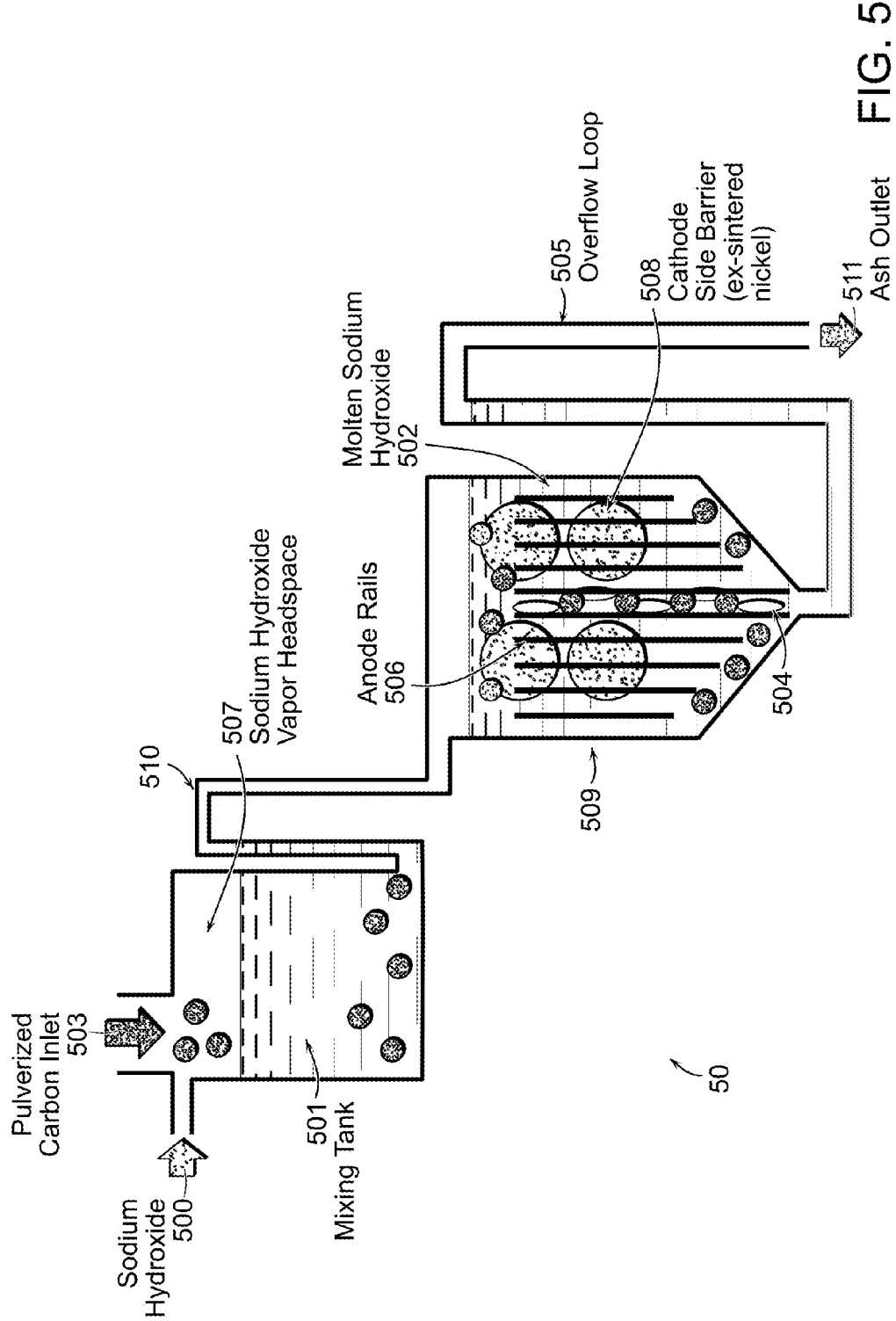
FIG. 5 is a diagram of a siphon purge pertinent to one or more aspects of the disclosure.

FIG. 5 illustrates one configuration of this process. As illustrated in the system 50 shown in FIG. 5, carbon 503 and sodium hydroxide electrolyte 500 enter a mixing tank 501 to produce a carbon-electrolyte slurry. The mixing tank may be positioned at least partially above the anode chamber to provide conditions in which a portion of the slurry may be siphoned into the anode chamber 509. The mixing tank may comprise sodium hydroxide vapor headspace 507 near the top of the tank. When the slurry reaches a certain level within the mixing tank, a portion of the slurry is siphoned into the anode chamber through the siphon loop 510. An inert gas such as nitrogen or steam may be added to the system, creating lift gas bubbles 504 within chamber 509. Chamber 509 may also be equipped with one or more anode rails 506 and cathode barrier 508. Cathode barrier 508 may be constructed from corrosion resistant material, such as sintered nickel mesh. Molten electrolyte 502, such as molten sodium hydroxide, in chamber 509 aids in the reaction process. The incoming slurry mixture may cause the fluid level in anode chamber 509 to rise and reach its own siphon loop height, causing the expended reactor slurry to drain suddenly through siphon loop 505 to ash outlet 511. The expended reactor slurry may then be introduced into a collection receptacle, which may lead to a cleaning system or to disposal. One advantage of this design may be that there is minimal mixing between expended materials and unreacted materials.

In certain embodiments of this disclosure, a dense flow of carbon particles enter a transport conduit, which may be a tube, positioned above the electrolyte fluid level in the fuel cell. The transport conduit may be constructed of a material that may allow the contents within the conduit and the contents surrounding the conduit to communicate with one another. For example, the transport conduit may be constructed of a porous metal or ceramic that may act to contain solids of a predetermined particle size, while allowing fluid flow and ion transport, such as hydroxyl ion transport.

Figure 6:
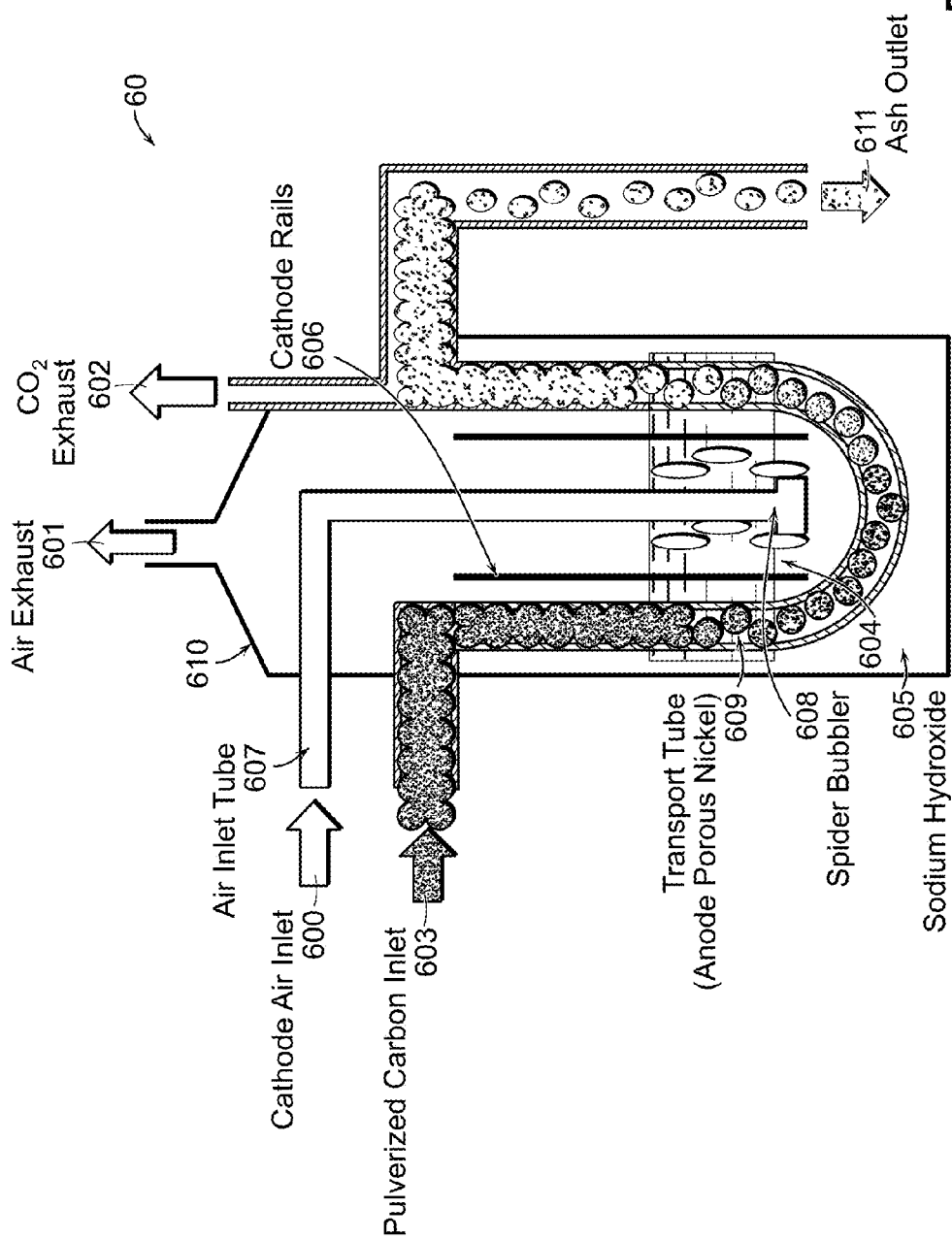
FIG. 6 is a diagram of a transport conduit fuel extrusion system pertinent to one or more aspects of the disclosure.

In this embodiment, as shown in the system 60 of FIG. 6, carbon 603 may be pushed through transport conduit 609 until it is submerged under the sodium hydroxide 605 fluid level. As the fuel is extruded through transport conduit 609, the carbon reacts and carbon dioxide gas is released. The reaction products, including solid ash byproduct, are contained in the transport conduit and moved vertically above the liquid level for disposal through $CO_2$ exhaust 602 and ash outlet 611. This design may allow the ash to be contained. Additionally, this design may not be dependent on density differences to separate ash from fuel and electrolyte. A cathode gas 600, such as air, may be added to chamber 610 through inlet 607 and a bubbler, such as spider bubbler 608. Bubbler 608 creates gas bubbles 604 that are processed through chamber 610 and may be removed from chamber 610 by way of exhaust 601. Chamber 610 may also be equipped with one or more cathode rails 606.

Figure 7:
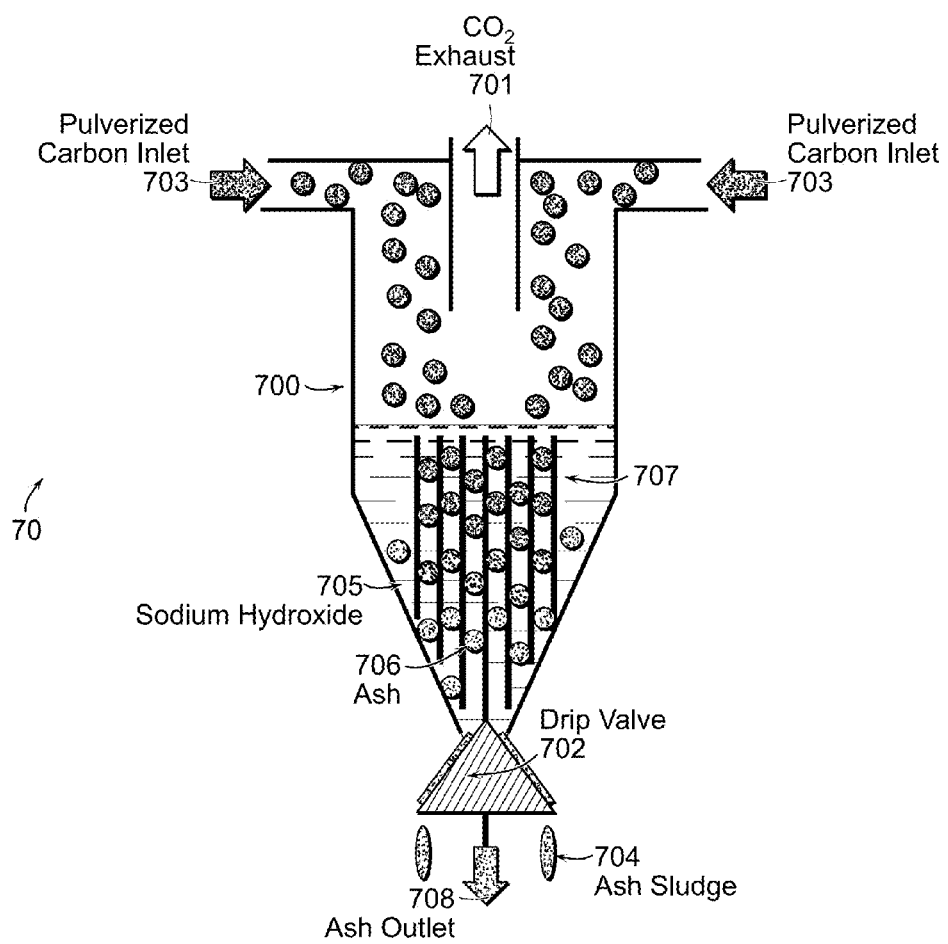
FIG. 7 is a diagram of a single-pass gravity feed system pertinent to one or more aspects of the disclosure.

In another embodiment, a single pass gravity fed anode chamber is provided. As illustrated in the system 70 shown in FIG. 7, carbon 703 and electrolyte (not shown) may be fed into the top of chamber 700. Once introduced into the chamber, the carbon may mix and react with molten electrolyte 705, such as molten sodium hydroxide. In certain instances, the carbon may also be mixed with recycled electrolyte. The wetted particles may then move or fall into the anode chamber and tumble through slightly tilted vertical anode rails 707. After reacting, the ash/electrolyte slurry may slowly leak from the bottom of the chamber through an outlet into a collection receptacle or to a cleaning system. In certain aspects, the ash/electrolyte slurry may exit the chamber through drip valve 702 and carbon dioxide generated in the reaction may exit through exhaust 701. Ash 706 present in chamber 700 may exit through drip valve 702 and ash outlet 708 as ash sludge 704.

In certain embodiments of this disclosure, a removal technique may be utilized that comprises a continuous flow of carbon-electrolyte slurry through the anode chamber. In this embodiment, the chamber may include at inlet, an outlet, and at least two compartments, or "column pairs."

Each compartment may comprise an inlet and an outlet and fluid or slurry may follow an indirect path, such as a tortuous flow path, from the inlet to the outlet. The compartments may be arranged in a series. The compartments may be designed such that the inlet of a first compartment is at an end opposite an outlet of the first compartment. The compartments may also be designed such that the outlet of the first compartment is the inlet of the second compartment. The compartments may also be arranged in parallel. The compartments may also be designed to share a common inlet. An inert gas or steam may be provided through a lift gas port to at least one of the compartments. Carbon and electrolyte may be added to the inlet of the anode chamber in the form of feed slurry, and expended slurry may be removed through an outlet of the anode chamber. The carbon and electrolyte may be mixed prior to addition to the inlet of the anode chamber in, for example, a mixing tank, to produce a slurry that is added to the inlet, or the carbon and electrolyte may be added separately to the inlet of the anode chamber. Carbon dioxide that is generated from the fuel cell reaction and lift gas may be removed from the system by way of a gas exhaust. Expended slurry may be introduced to a cleaning process to produce recycled electrolyte. In certain instances, at least a portion of the recycled electrolyte may be introduced to the feed slurry.

In certain aspects, at least a portion of the feed slurry in each compartment is reacted to produce a series of reaction mixtures. Each reaction mixture may possess a ratio of expended slurry to feed slurry. The ratio of expended slurry to feed slurry may increase as the slurry flows from the first compartment to the last compartment in the series. The value of the ratio of expended slurry to feed slurry may be selected in order to provide for a desired efficiency or a desired generation of electrochemical power, or other output value of the system. The value of the ratio of expended slurry to feed slurry may continue until it reaches a predetermined value or range of values. In various aspects, the number of compartments in the series may correspond with the predetermined value or range of values. In certain instances, the ratio of expended slurry to feed slurry may approach a value of one. In specific instances, the ratio may be a value of approximately one. This configuration may be designed to be a single or multiple pass reactor, and the dimensions may be selected to ensure the carbon is completely consumed as it passes through the reactor.

Figure 8:
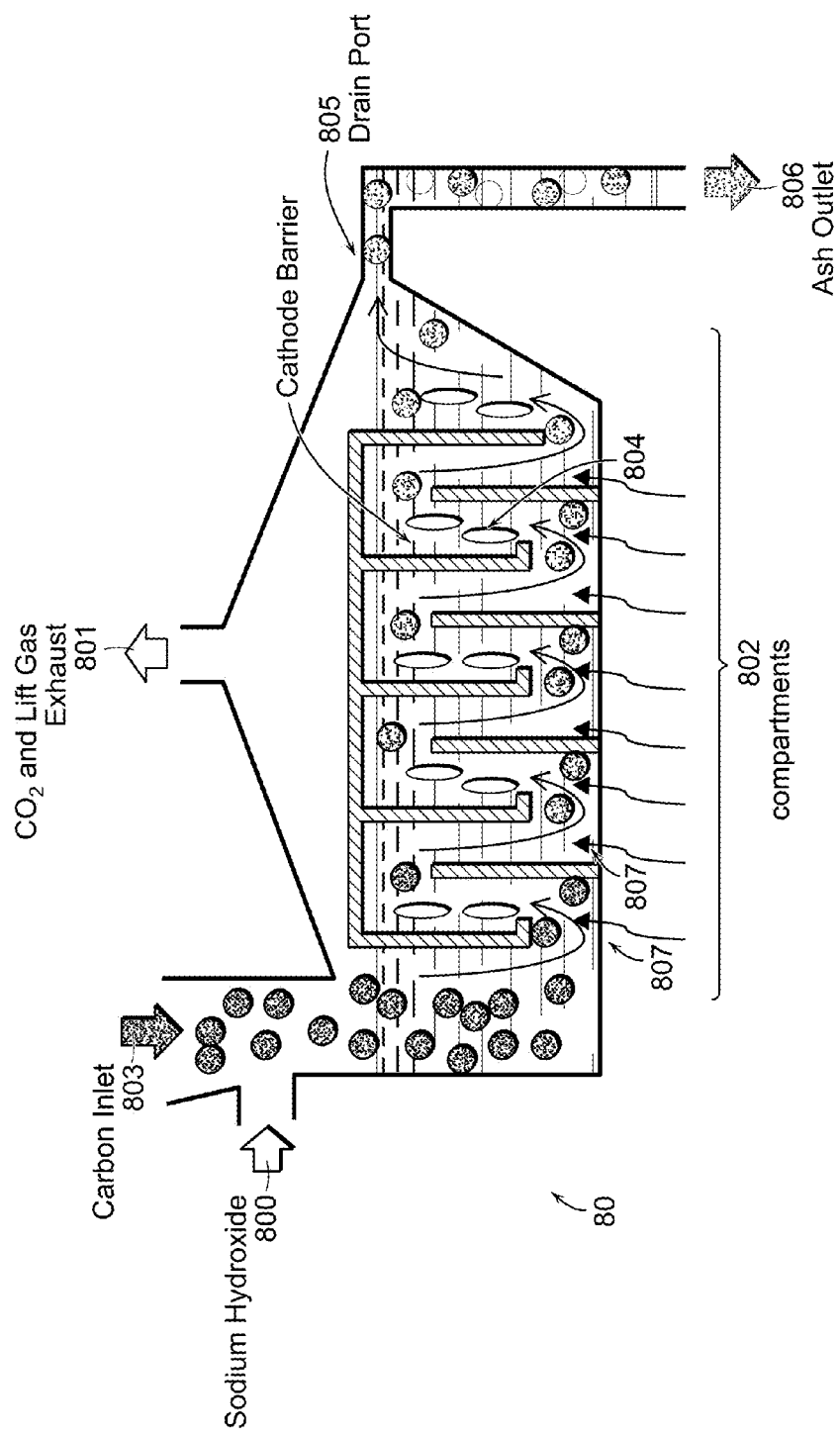
FIG. 8 is a diagram of a labyrinth anode system pertinent to one or more aspects of the disclosure.

As shown in the system 80 depicted in FIG. 8, a "labyrinth" configuration of the anode chamber is illustrated. Carbon 803 and at least one of fresh or recycled electrolyte 800, such as sodium hydroxide electrolyte, may be mixed prior to or at an inlet to the anode chamber. The resulting slurry may be entrained and carried into the first of a series of compartments 802. Small lift gas ports 807 in each of the compartments 802 may create lift gas bubbles 804 within compartments 802. The lift gas may induce vertical flow, which may transport slurry sequentially to the next compartment. The last compartment may comprise a chamber outlet by exiting into drain port 805. Carbon dioxide and inert gas may be removed from the system by way of exhaust 801. Expended slurry may exit the chamber by overflowing into drain port 805 and flowing through expended slurry outlet 806. Expended slurry outlet 806 may feed into a cleaning system. In certain embodiments, the carbon and electrolyte feed slurry may be taken through a tortuous path based on the construction and dimensions of the anode reactor, compartments, location of the one or more lift gas ports, and flow rate of at least one of the carbon and electrolyte.

Overall mass transport through the anode chamber may be controlled by the quantity of carbon and electrolyte fed into the front of the cell. The mixing and concentration gradients, however, may be controlled by steam or inert gas flow through the at least one lift gas port. In at least one aspect, the flow rate of slurry through the chamber is controlled by providing feed slurry having a predetermined concentration of carbon and electrolyte. In certain aspects, the concentration gradient of carbon and electrolyte in each compartment may be controlled by inducing vertical flow of the lift gas from the lift gas ports. In further aspects, the concentration gradient in each compartment may be controlled by inducing vertical flow of the lift gas from the lift gas ports at predetermined flow rates or predetermined ranges of flow rates. The predetermined flow rates or ranges of flow rates may be of equal value for each lift gas port, or may be of differing values. The mixing and concentration gradients of the carbon and electrolyte and the dimensions of the anode chamber and compartments may be adjusted such that complete carbon reaction may occur before the slurry is removed by way of the ash outlet.

This embodiment of the disclosure may provide a slurry that is hydrodynamically mixed and passed through the cell. It may also provide a system that prevents clogging or charring of the carbon particles in the system, and may also abrade the carbon particles to remove ash layers that may have built up in the system. Vanes, fins, or baffles may be added within the anode chamber or within one or more of the compartments. This may increase anode surface area and reduce internal cell resistance. Certain embodiments, including this embodiment, may have an overflow feature that regulates the slurry height in the chamber.

Figure 9:
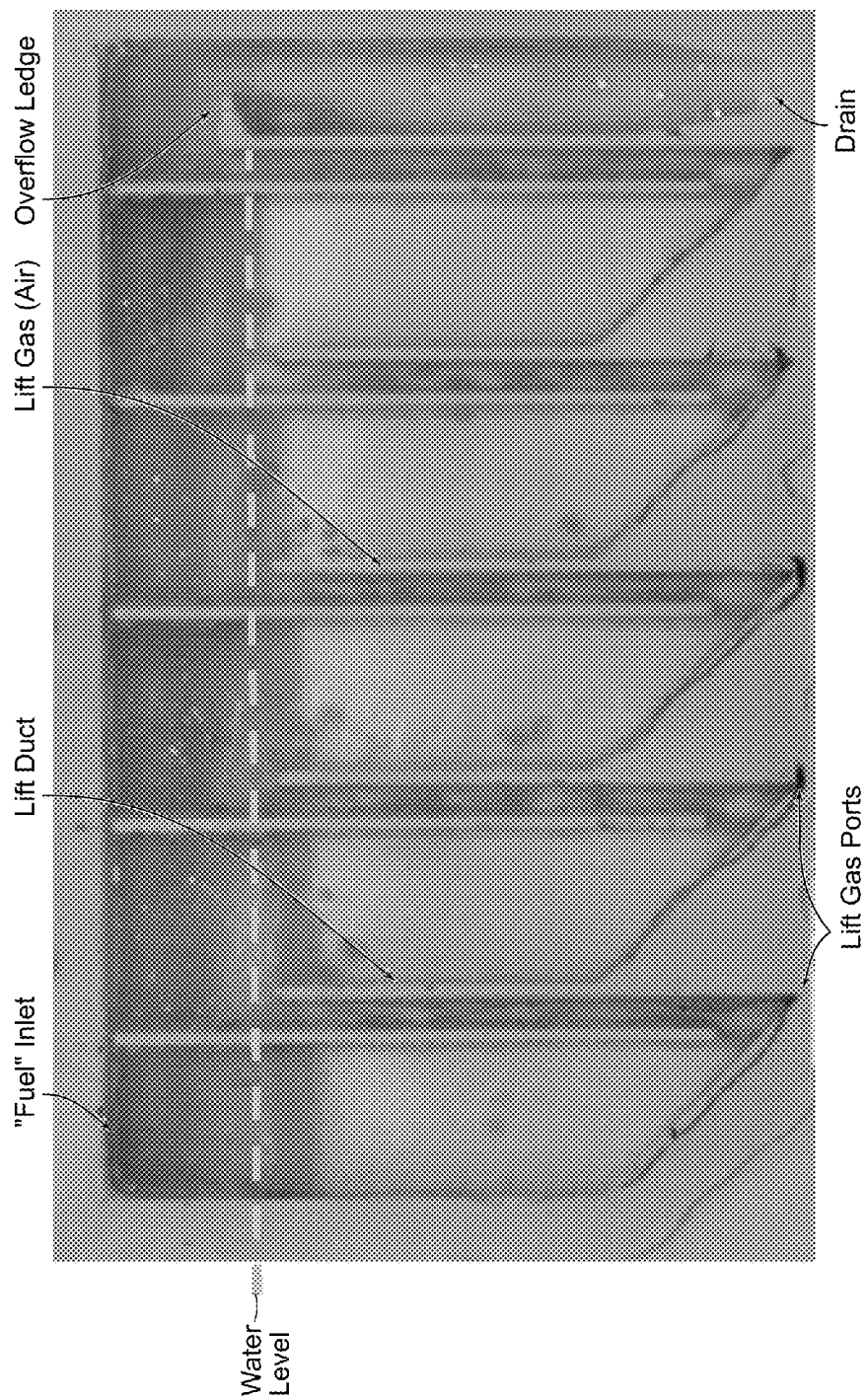
FIG. 9 is a picture of a labyrinth anode prototype pertinent to one or more aspects of the disclosure.

This embodiment of the disclosure has been demonstrated with a cold flow (room temperature) prototype shown in FIG. 9. The flow field consisted of rapid prototype stereolithography (SLA) material coated with acrylic white paint for tracer contrast. The height of each column was 4.25 inches (10.8 cm). A 0.25 (0.6 cm) inch thick polycarbonate plate was sealed to the flow field using silicone adhesive. This design included five column pairs fed by a regulated compressed air supply through the lift gas ports. Tap water was used to represent molten sodium hydroxide and high carbon fly ash to represent solid fuel. A rotary displacement pump circulated water from the drain back to the inlet port.

Figure 10:
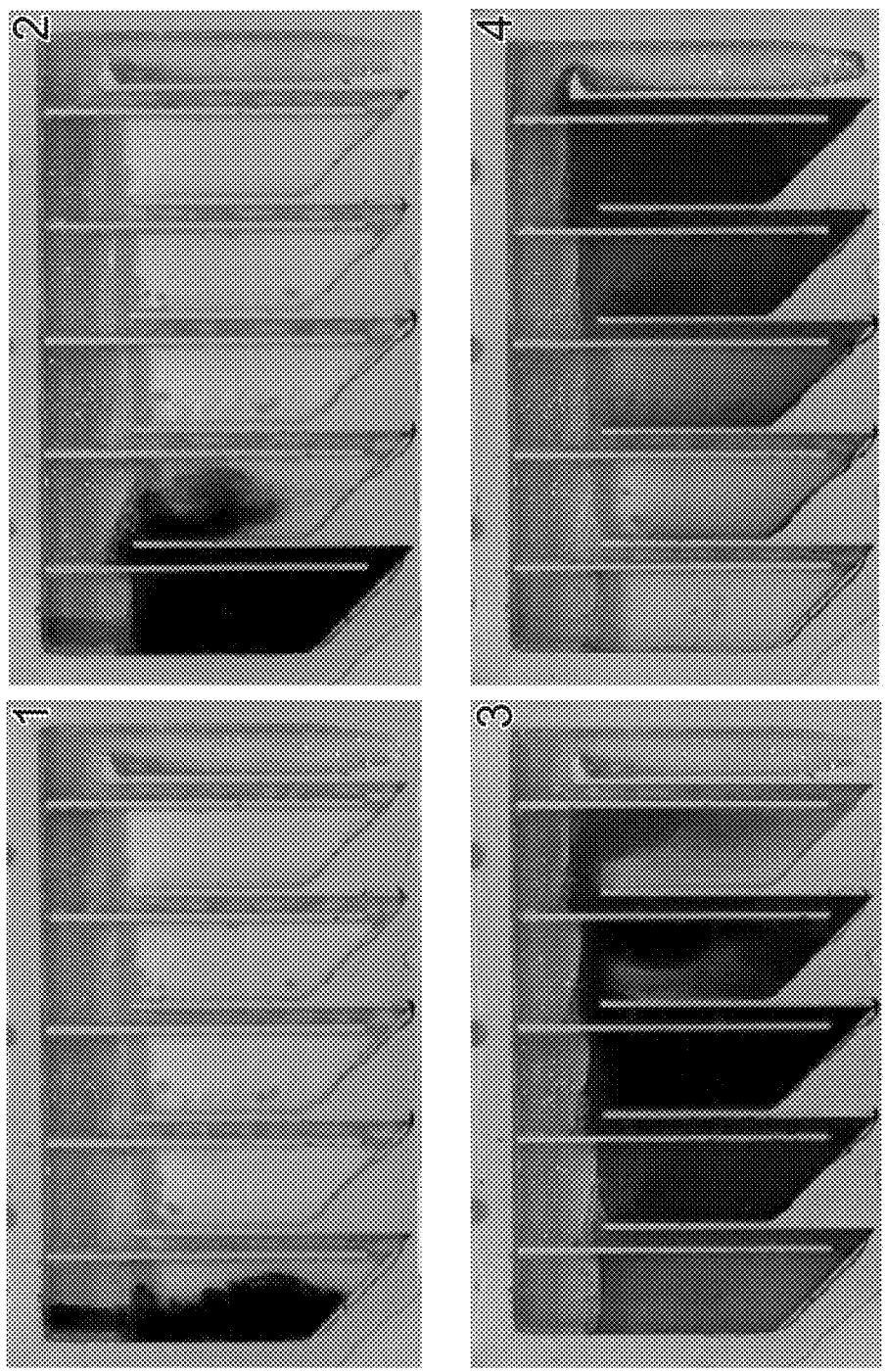
FIGS. 10(1)-(4) are pictures of a labyrinth anode prototype pertinent to one or more aspects of the disclosure.

FIG. 10 shows the prototype in operation. In frame 1 of FIG. 10, fly ash slurry is added to the inlet to the anode chamber. In frame 2 of FIG. 10, the slurry has been driven up the first lift duct and into the second subcompartment or column pair. In frames 3 and 4 of FIG. 10, movement of solids through the cell towards the drain port is shown. Frames 1, 2, 3, and 4 occur at times 0, 4, 22, and 42 seconds, respectively. This prototype shows that this embodiment may be effective at preventing back mixing due to the first subcompartment being cleared of solids.

Figure 11:
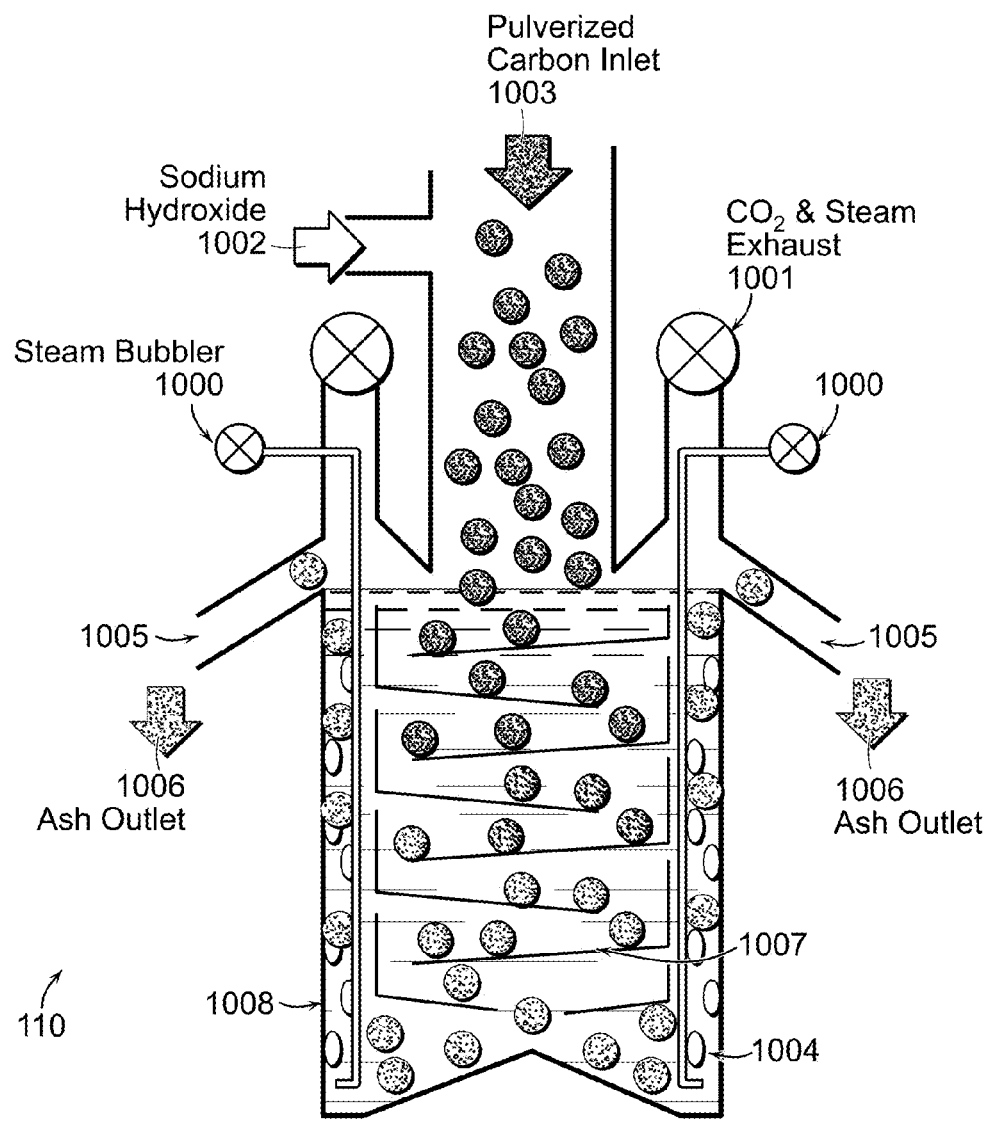
FIG. 11 is a diagram of a labyrinth anode removal process pertinent to one or more aspects of the disclosure.

This embodiment of the disclosure may also provide for a "labyrinth" configuration in which each of the subcompartments is stacked in a vertical direction, as shown in system 110 depicted in FIG. 11. In this embodiment, anode rails 1007 may be arranged in offset horizontal rows that are positioned horizontally, or may be positioned at an angle to encourage flow of carbon 1003 and other components, such as electrolyte 1002 through the system. Carbon fuel 1003 and electrolyte 1002 may enter the top of the reactor and may be encouraged to move in a "zigzag" downward pattern through anode rails 1007. This configuration may increase the residence time of carbon particles and may maximize the use of the anode surface area. Lift gas, for example nitrogen or steam, may be injected through bubbler 1000. Lift gas creates lift gas bubbles 1004 within chamber 1008. Lift gas bubbles 1004 that are processed through anode chamber 1008 may be removed from the chamber by way of exhaust 1001. Carbon dioxide that is produced through the reaction of the carbon fuel may also be removed from chamber 1008 by way of exhaust 1001. This configuration may be designed to be a single pass or multiple pass reactor, and the dimensions may be selected to ensure the carbon is completely consumed as it passes through the reactor. Expended electrolyte and ash may be diverted to the lift gas ports, which may transport the mixture vertically to overflow feature 1005 at the top of the tank. There, the ash and some of the electrolyte may be directed to outlet 1006, such as a drain conduit. A portion of the electrolyte may flow back into the reactor through a porous mesh.

In certain embodiments of the disclosure, systems and methods are provided to clean and recycle particular components of the system, for example electrolyte, after being removed from the anode chamber of the DCFC.

The systems and methods disclosed herein may provide a cleaning and recirculating system and process. The cleaning process may comprise a vaporization separator in a DCFC system. Expended slurry may be drained from the anode chamber into a vaporization chamber that may vaporize a desired component of the system, for example an electrolyte. In certain embodiments, the electrolyte is an alkali hydroxide, such as sodium hydroxide, but other electrolytes may also be used. The vaporization cleaning process may comprise vaporizing the electrolyte, such as sodium hydroxide, to separate it from ash and other chemical impurities. In cases in which the electrolyte is sodium hydroxide, the vaporization chamber may be operated at approximately 1400° C. The vaporized sodium hydroxide may then be directed to a mixing tank to mix the sodium hydroxide with carbon, or may be directed to the fuel cell inlet port. In either case, the sodium hydroxide may condense as it is brought into the mixing tank or cell at the operating temperature of the fuel cell or the mixing tank, which may be approximately 600° C. The remaining ash and sodium carbonate mixture ($Na_2CO_3$) that are present in the vaporizer may be removed as waste and may be further processed or disposed of. A diagram of this process is shown in FIG. 12.

Figure 12:
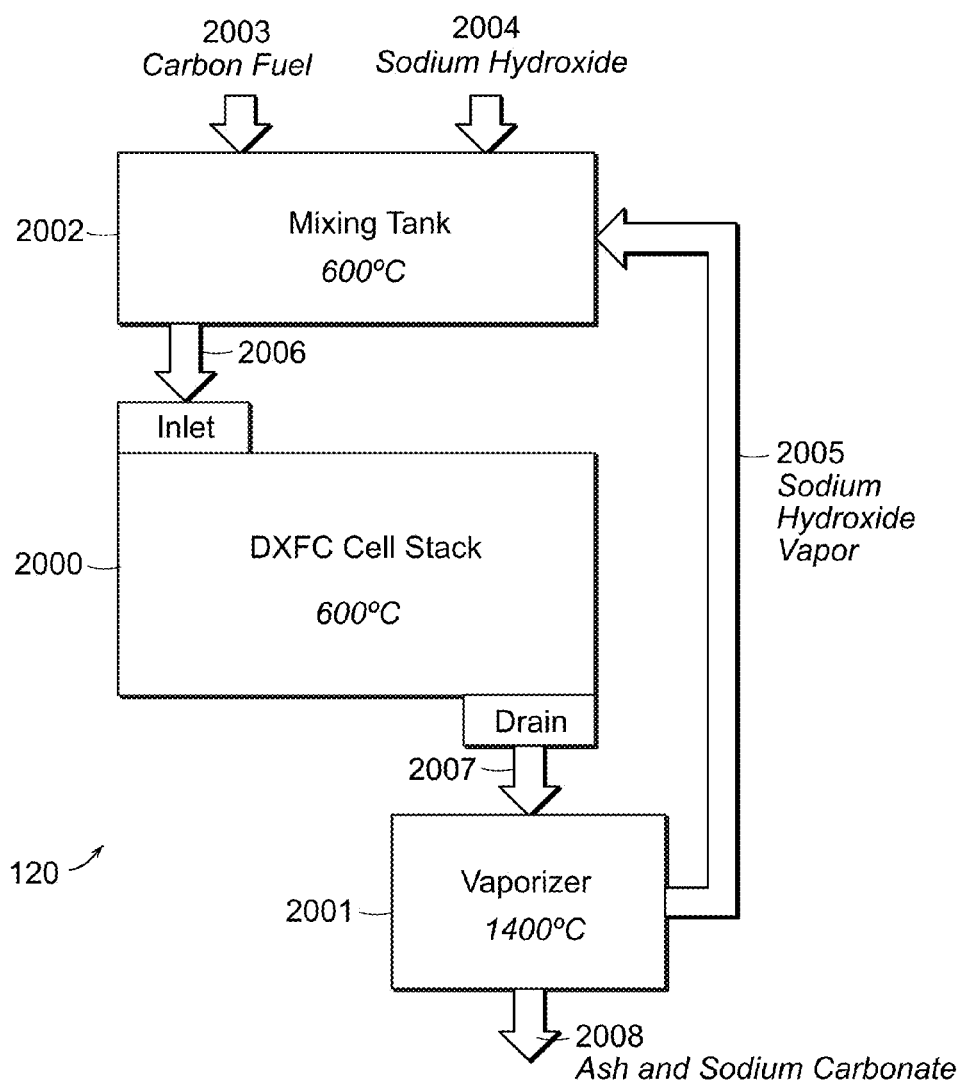
FIG. 12 is a block diagram of a vaporization cleaning system pertinent to one or more aspects of the disclosure.

As shown in the system 120 illustrated in FIG. 12, the DCFC stack 2000 operates at approximately 600° C. Expended slurry may be removed from the cell stack by way of drain 2007 to vaporizer 2001 comprising a chamber that operates at approximately 1400° C. to vaporize the sodium hydroxide. The chamber may be maintained at a temperature to produce vaporized electrolyte. The vaporized electrolyte 2005 may be returned to mixing tank 2002 that may be held at approximately 600° C. Vaporized sodium hydroxide 2005 may condense in mixing tank 2002 to produce recycled electrolyte. At least a portion of the recycled electrolyte may be combined with carbon 2003 in mixing tank 2002 to be introduced into cell stack 2000 through inlet 2006, or a portion of the recycled electrolyte may be introduced directly into the cell stack. Mixing tank 2002 may also comprise sodium hydroxide electrolyte 2004 that does not originate with vaporizer 2001. The vaporized electrolyte may also be sent to an electrolyte reservoir, and may be consumed as desired or needed. Ash and sodium carbonate 2008 that are in the vaporizer, but that have not been vaporized, are removed from the vaporizer to be further processed or disposed of. The vaporization process may require no moving parts, which may reduce cost and increase reliability. The vertical flow of hydroxide vapors to the inlet may act as an electrolyte recirculation pump.

In certain embodiments of the disclosure, methods and systems are provided for cleaning and recirculation of electrolyte utilizing a separation system. The separation system may first solubilize the electrolyte, and then precipitate the electrolyte. For example, this may be performed by utilizing an aqueous separation system. After exiting the fuel cell, expended slurry comprising carbon and alkali hydroxide electrolyte may be cooled down and submersed in water. The electrolyte may dissolve while insoluble components present in the expended electrolyte may be filtered by mechanical techniques. In certain aspects, electrolyte may be separated from the expended slurry by solubilizing the electrolyte at a predetermined temperature to produce a dissolved electrolyte solution. In some aspects, the predetermined temperature may be lower than the operating temperature of the direct carbon fuel cell. For example, an alkali hydroxide electrolyte may be solubilized at a predetermined temperature that is lower than the operating temperature of the direct carbon fuel cell to produce a dissolved alkali hydroxide solution and an insoluble sodium carbonate and ash. The remaining electrolyte solution may be cooled further to ambient temperature where at least some of the electrolyte precipitates out of solution to form an electrolyte precipitate. For example, dissolved alkali hydroxide solution may be cooled further to form an alkali hydroxide precipitate. This electrolyte precipitate may be separated from the dissolved electrolyte solution to form a recycled electrolyte. In certain aspects, the electrolyte precipitate may be separated from the dissolved electrolyte solution by filtering or any other separation technique known to one of ordinary skill in the art. A portion of the recycled electrolyte may be sent to at last one of the anode chamber for reuse, the slurry tank, and to a reservoir for later use.

Figure 13:
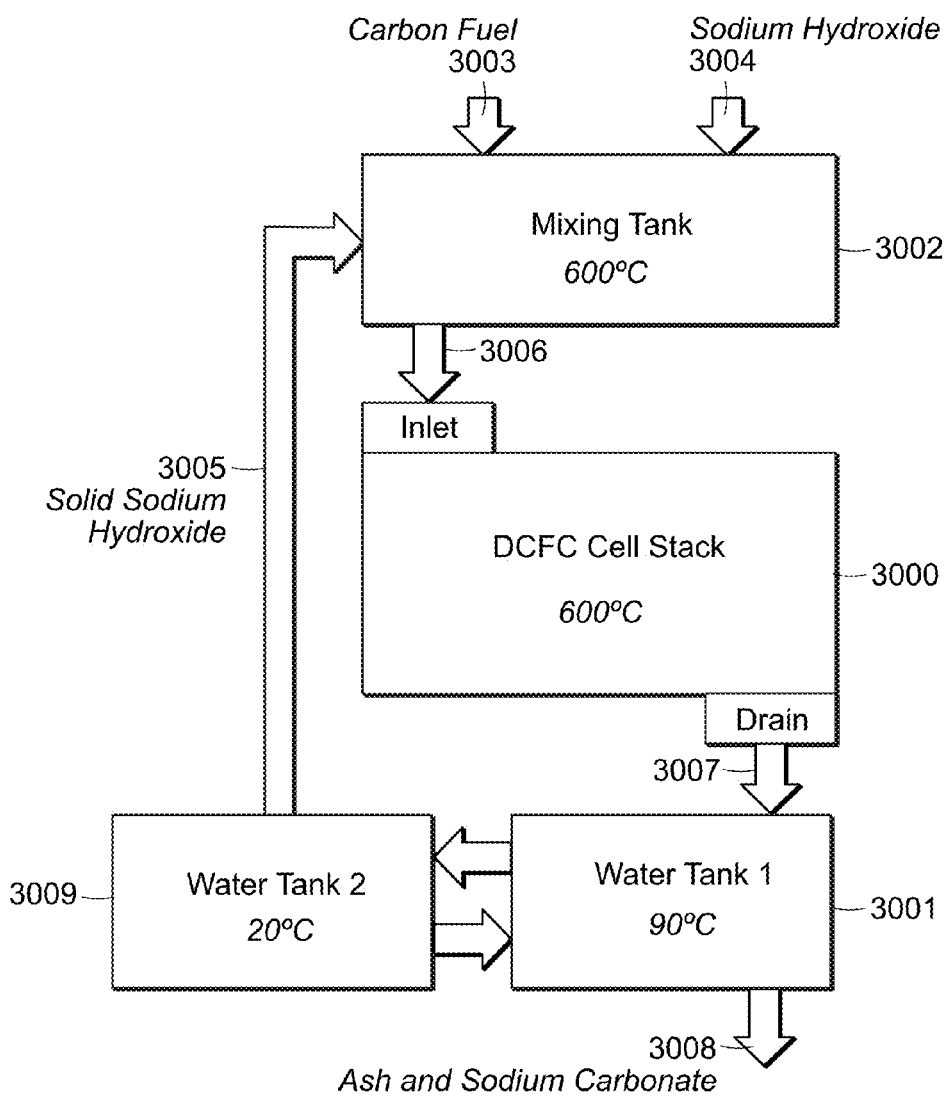
FIG. 13 is a block diagram of an aqueous cleaning system pertinent to one or more aspects of the disclosure.

An example of this system is illustrated in FIG. 13. A contaminated electrolyte mixture may exit the cell stack 3000 through drain 3007 and be introduced into a water tank 3001 at a reduced temperature to solubilize the electrolyte. For example, a contaminated sodium hydroxide electrolyte mixture may exit the cell stack and be introduced into water tank 3001 at a temperature of approximately 90° C., where it may mix with an aqueous solution of sodium hydroxide, typically, less than 10M, to solubilize the electrolyte. Ash and sodium carbonate may precipitate out of solution at the reduced temperature, and may be removed from water tank 3001 through exit 3008. While maintained in water tank 3001, the sodium hydroxide electrolyte may dissolve in water. The dissolved sodium hydroxide may be introduced into second water tank 3009 which may be held at or close to approximately room temperature, or 20° C., where at least a portion of the electrolyte may precipitate out as pure sodium hydroxide. This precipitated sodium hydroxide electrolyte 3005 may be filtered or separated out and sent to mixing tank 3002 or to fuel cell 3000 to be reused in the system as recycled electrolyte. At least a portion of the recycled electrolyte may be combined with carbon 3003 in mixing tank 3002 to be introduced into cell stack 3000 through inlet 3006, or may be introduced directly into cell stack 3000. Mixing tank 3002 may also comprise sodium hydroxide electrolyte 3004 that does not originate from the aqueous cleaning process. The recycled electrolyte may also be sent to an electrolyte reservoir, and may be consumed as desired or needed. One advantage to the aqueous cleaning process is that it may not require high temperatures.

In accordance with one or more embodiments, the systems and methods described herein relate to a system for generating power in a DCFC system. The system may comprise a source of carbon. The source of carbon may be provided as previously discussed. The system may further comprise a pyrolyzer that is connected downstream from the source of carbon. The term "pyrolyzer" refers to a device that subjects a chemical substance to the pyrolysis process, i.e., a thermochemical decomposition of organic material at elevated temperatures without the participation of oxygen. The system may further comprise a source of electrolyte. The source of electrolyte may be provided as previously discussed. For example, the electrolyte may be selected from the group consisting of alkali hydroxides, eutectics, and carbonates. The system may further comprise a slurry tank connected downstream of the pyrolyzer and the source of electrolyte. The slurry tank may be a mixing tank where a source of at least one carbon and a source of at least one electrolyte are combined together. The system may further comprise a DCFC fluidly connected downstream of the slurry tank. The DCFC may be any one of the embodiments discussed in the present disclosure. The DCFC may further comprise a lift gas inlet. The lift gas inlet may be connected to a source of lift gas. The lift gas may be any lift gas discussed above. The system may further comprise a cleaning system. The cleaning system may be provided as previously discussed, for example, a vaporization system or an aqueous separation system. The cleaning system may be any system suitable for processing expended slurry and producing at least one source of recycled electrolyte. The cleaning system may be fluidly connected downstream of the DCFC and fluidly connected upstream of the slurry tank.

In accordance with one or more embodiments, the systems and methods described herein relate to a method of generating electrochemical power from a DCFC. The method may comprise introducing a fuel comprising a carbon and an electrolyte to a chamber of the DCFC. The carbon may be provided as previously discussed. The method may further comprise suspending at least a portion of the fuel in the chamber. Suspending acts to promote mixing of carbon with the electrolyte, and promotes contact of the fuel with an electrode surface of the anode chamber of the fuel cell. The method may further comprise reacting at least a portion of the carbon and the electrolyte in the chamber to generate electrochemical power, expended fuel, and carbon dioxide. The expended fuel may be further removed from an outlet of the chamber and may be further subjected to a cleaning process. The cleaning process may produce recycled electrolyte, a portion of which may be introduced into the fuel. The carbon dioxide may be further removed from an exhaust outlet of the chamber. The system may be constructed and arranged to operate at an efficiency level of at least 50%. In certain aspects, the system may operate at an efficiency level of at least 20%, at least 30%, or at least 40%. In at least one aspect, the system may operate at an efficiency level of at least 50% and produce at least 20 kW of electrochemical power.

The electrochemical power generated by the DCFC systems and methods described herein may be used in a wide variety of applications. For example, the generated electrochemical power may be used to generate mechanical energy (or power) which can be used to drive a wide range of mechanical systems (including pumps, compressors, vehicles, conveyances, or other similar mechanical devices); or used to drive an electrical generator to meet electrical power needs—for residences, businesses or office buildings, or commercial and industrial applications. The DCFC system can supply electrical energy to power grids, and can be an alternative to power generation plants. Power generating systems commonly are used for industrial, construction, mining, oil and gas exploration, and other commercial applications. For example, for industrial applications, the power generating systems may be used to support prime and/or backup electric power for factories; for construction, mining, and oil and gas exploration applications, the power generating systems may be used to generate prime power for the operation of equipment, given that the locations of such activities often are too remote and distant from municipal power grids; and, for commercial applications, the power generating systems may provide backup electric power for electrical systems should the municipal power grid temporarily lose power due to a storm, natural disaster, sabotage, etc. The DCFC system may be adapted to obtain and/or generate, store and distribute electrochemical power for use as an energy source in residential, commercial, industrial, utility, power generation, and other facilities and applications. In some embodiments, energy may be immediately discharged for use, or energy may be stored for later use.

In various aspects, the DCFC system is capable of generating a variable power output. For example, the power may be controlled or allowed to increase or decrease over a short period of time. In certain aspects, the DCFC system is capable of maintaining a predetermined efficiency level, while allowing the amount of electrochemical power to fluctuate or decrease. In certain instances the amount of electrochemical power may decrease substantially. For example, the DCFC system may be capable of maintaining efficiency above 40%, while fluctuating power from 5 to 60 kW. In at least one embodiment, the system is capable of maintaining an efficiency level of at least 50% while substantially reducing the amount of electrochemical power produced.

Figure 14:
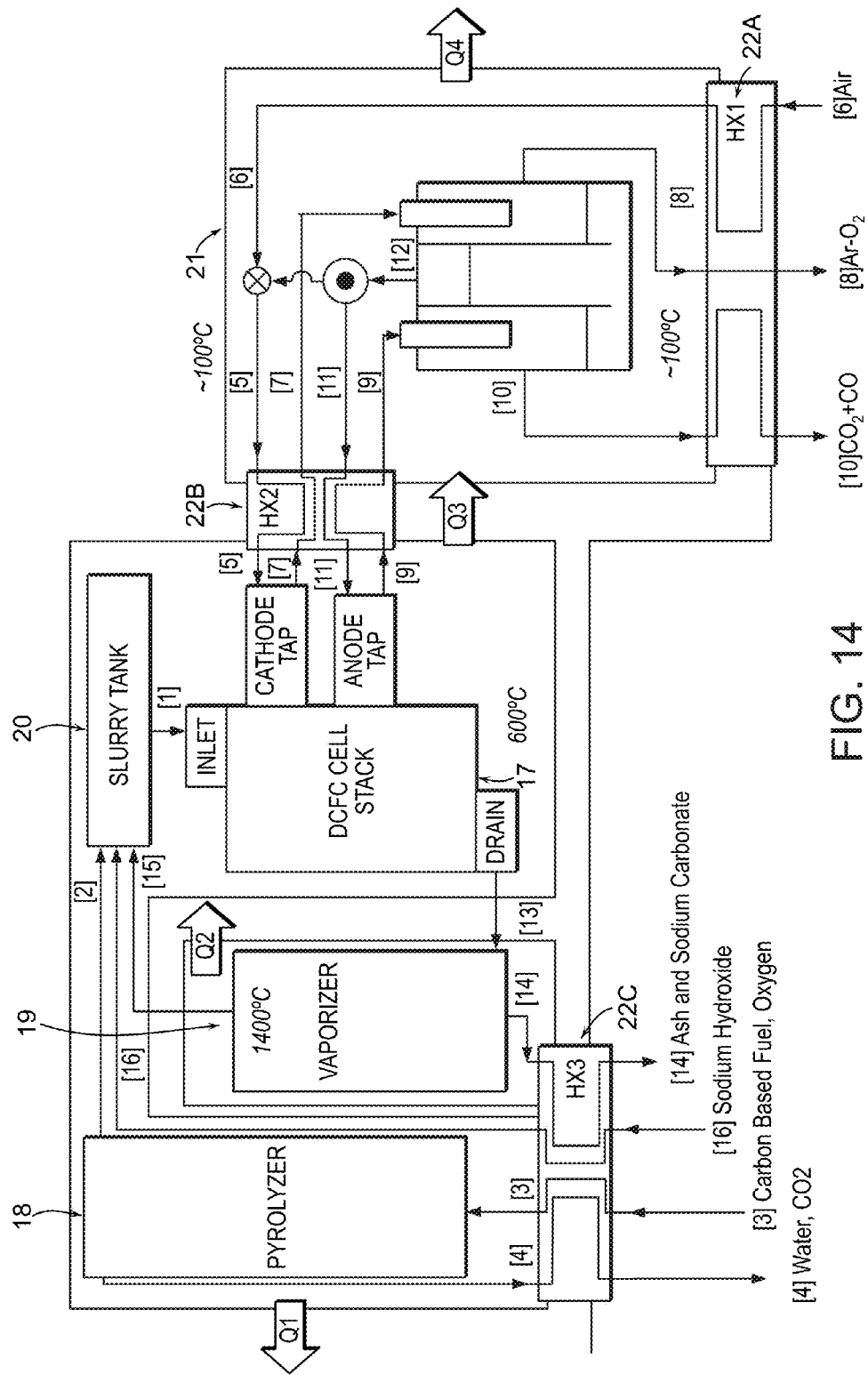
FIG. 14 is a diagram of a continuous operation DCFC power generation system pertinent to one or more aspects of the disclosure.

In certain embodiments of the disclosure, a combination of the systems and methods may be used. For example, FIG. 14 illustrates an embodiment of one of a number of possible systems. This example uses a labyrinth anode with vaporization electrolyte cleaning. However, other combinations of the embodiments of the present disclosure may be used in DCFC systems to generate power consistently over long periods of time.

In this example, the DCFC stack 17 is located at the center of the system. It is surrounded by equipment including a pyrolyzer 18, vaporizer 19, slurry tank 20, and steam management system 21. Insulation and heat exchangers 22 may be placed between the chambers and at particular locations within the system as desired or needed.

Carbon fuel 3 at ambient temperature enters a heat exchanger (HX3) 22C where it is brought to approximately 600° C. and passed into pyrolyzer 18. Although this example depicts a pyrolyzer in its system, a similar system may be constructed without the use of pyrolyzer. Any carbon fuel source may be used so long as it may react in the DCFC to produce carbon dioxide and generate power.

In pyrolyzer 18, carbon fuel 3 is held at temperature in an inert atmosphere, which breaks the carbon-hydrogen bonds and reforms the fuel into solid carbon char, solid inorganic ash, volatile hydrocarbon gases, and hydrogen gas. The hydrocarbon volatiles and hydrogen enter a secondary internal compartment where they undergo combustion with air to heat the endothermic pyrolysis reaction. This may be referred to as autothermal pyrolysis or reforming.

The solid compounds (carbon and inorganic) 2 are mixed with sodium hydroxide 16 in the slurry or mixing tank 20. The mixed slurry 1 may then be introduced through an inlet into DCFC stack 17 where carbon is converted to carbon dioxide ($CO_2$), generating electrical power. DCFC stack 17 is operated between approximately 500° C. to 600° C. and steam is used as a lift gas to provide hydrodynamic transport through the DCFC anode chamber.

After reacting in DCFC stack 17, the expended slurry 13, (including inorganic solids, sodium hydroxide, and sodium carbonate) is passed to vaporizer 19. Vaporizer 19 operates at a temperature of approximately 1400° C. and the sodium hydroxide is vaporized and directed back into slurry tank 20 as recycled sodium hydroxide stream 15 where it condenses to a liquid for reuse. The remaining electrolyte contaminates, including ash and sodium carbonate are removed as waste 14. Steam is used as a lift gas to provide hydrodynamic transport through the DCFC anode chamber.

To support the cathode reaction, ambient air 6 is brought in through another heat exchanger (HX1) 22A and combined with steam. The mixture is passed through another heat exchanger (HX2) 22B before entering the cathode side of DCFC stack 17. The steam supply for this mixture, and the anode lift gas, is generated from a steam water management system 21.

Figure 15:
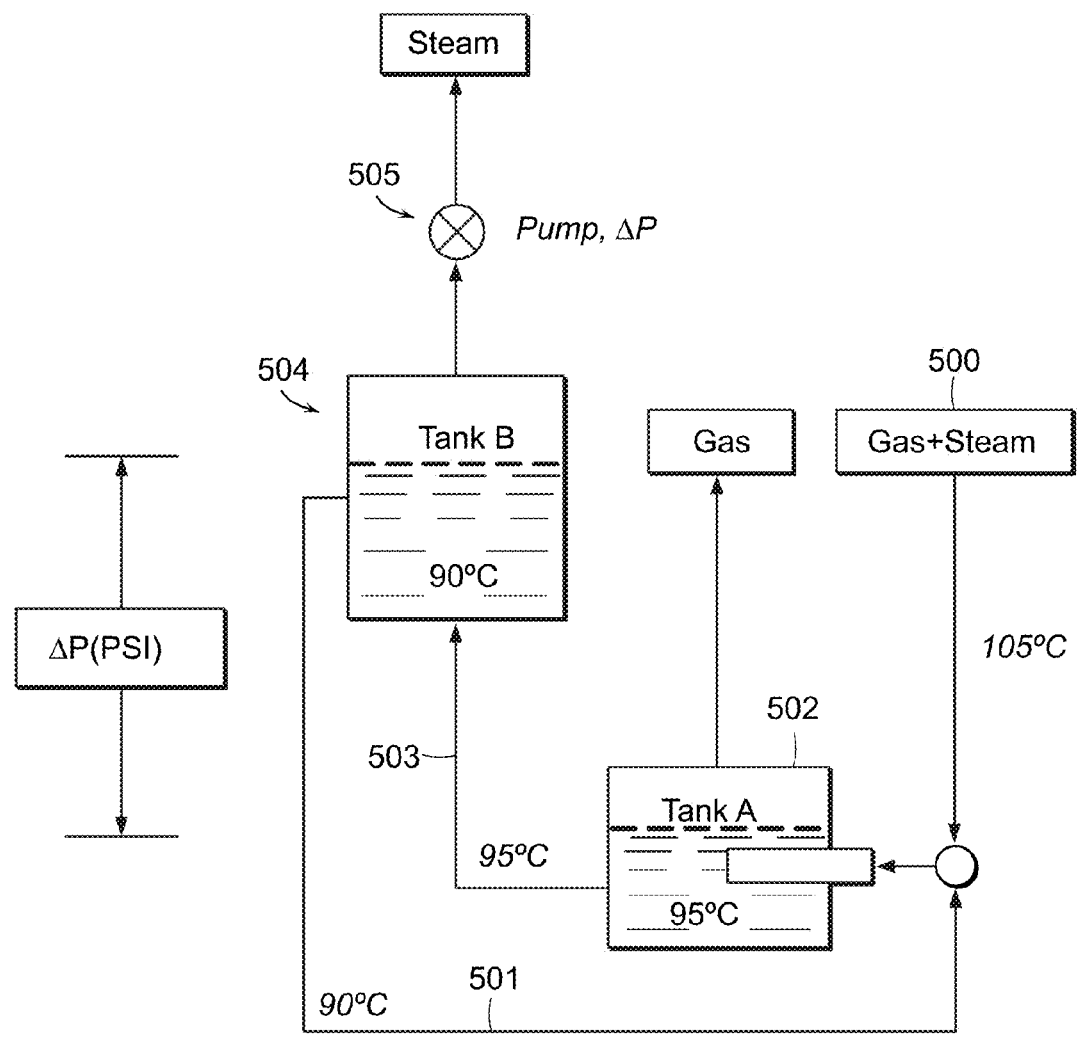
FIG. 15 is a diagram of a water management system pertinent to one or more aspects of the disclosure.

A phase change or steam water management system may be employed to provide a supply of steam to the system. A simplified example of this system is shown in FIG. 15. This system 150 supplies the steam for the lift gas and cathode side demands. A system of this kind may be necessary because after the steam is passed through the anode and cathode, it is mixed with carbon dioxide and nitrogen gas, respectively. These gases may need to be separated before the steam can be recirculated in the system. This may require cooling the steam mixture below 100° C. to condense the water and selectively remove the waste gases. The water may then be re-boiled for continuous steam generation.

As shown in system 150 illustrated in FIG. 15, steam/gas mixture 500 enters the system at 105° C. and 14.7 psi (1 atm). The mixture is then mixed with 90° C. water 501 while entering Tank A 502, also at 14.7 psi (1 atm). The drop in temperature causes the steam to condense, which heats the water to approximately 95° C. The heated water 503 is then convectively pumped to Tank B 504, which is at a slight vacuum of −4.7 psi. The reduced pressure may cause the incoming water to boil, which may cool the surrounding water to about 90° C. Tank B may also release steam. The cooled water may then be recirculated to Tank A, and the process may be continued. The only energy required to sustain this process may the vacuum pump 505. This energy is far less than what is required to boil the water alone. This water management system may be used to recycle the water/gas exhausts from both anode and cathode compartments of the DCFC stack.

As shown in FIG. 14, steam water management system 21 is used to condense steam from the gas mixture 9 exiting the anode chamber. The heat of vaporization is reclaimed to produce new steam to supply the lift gas ports and cathode chamber. The cathode exhaust 7 is also passed through the steam management system to condense any steam not used for oxygen reduction.

Under nominal conditions, the system modeled in this study can achieve a 54% HHV efficiency while generating 22 kW. Variable fuel cost at maximum efficiency is 1.9 cents per kWh, which is a 34% reduction over existing coal generated electricity. Maximum power output is 67 kW, but efficiency drops to 30%.

Each cell is approximately 4 feet (1.22 m) long, 2.5 feet (0.76 m) tall, with a depth of 0.35 inches (0.89 cm). A total of 300 cells were required to generate the power output listed above, which means the cell stack alone has a depth of almost 9 feet (2.74 m).

In certain embodiments of the present disclosure, a DCFC is provided that allows for a continuous, steady-state operation that is also tolerant of fuels with significant ash content. Using the methods described in this disclosure, issues present in the conventional direct carbon fuel cells are overcome. Specifically, certain embodiments of the present disclosure provide a continuous power output, a "stackable" fuel cell system to increase output voltage, electrolyte recycling, ash removal, antifouling, more complete carbon utilization, and a constant operating temperature that facilitates heat management. In certain embodiments, this system may run at efficiency levels of 54% operating at a current density of 18 mA/cm$^2$. In certain embodiments, the system as presently disclosed may reduce internal cell resistance and carbonate formation to produce an economically viable DCFC.

In certain embodiments, more than one DCFC system may be used to provide for a desired power generation level. More than one DCFC system may be used with the option of disconnecting one or more systems from a larger system, depending on the power needs at a particular time or a particular day or series of days. In certain embodiments in which more than one DCFC system is assembled, certain DCFC systems may be kept online, while one or more other systems are kept offline, depending on power demands. For example, five systems may be assembled, and during high power needs, all five systems may be kept online. During periods of low power demand, two systems, for example, may be kept online, while three systems may be kept offline. The DCFC systems may be arranged in series or parallel, and may share one or more components, such as a cleaning system, or exhaust apparatus.

Certain embodiments of the present disclosure may provide systems and methods that may be utilized in commercial applications, such as large scale power generation, remote power generation, and waste carbon management.

EXAMPLES

Example 1

Thermodynamic Model for DCFC with Labyrinth Configuration

According to at least one embodiment of this invention, a thermodynamic model was defined and generated for a labyrinth configuration DCFC system, as previously discussed and illustrated in FIG. 14, to fully evaluate performance of the system under various conditions. The thermodynamic model was evaluated in an automated manner by way of modern computer systems. It should be noted that while the performance model utilized a labyrinth configuration DCFC, the model could also be applied to the circulating reactor with a siphon purge, such as the DCFC depicted in FIG. 5. The thermodynamic model incorporated fuel, electrolyte processing, and a vaporization cleaning method to predict system level efficiency performance.

The model gave insight into performance sensitivities to certain unknown parameters, such as carbonate formation and the Boudouard reaction. Some of the evolved CO$_2$ from DCFC stack 17 combines with sodium hydroxide to produce sodium carbonate. Additional CO$_2$ reacts with carbon fuel to form CO through the Boudouard reaction. The Boudouard reaction not only consumes carbon fuel, but is endothermic and requires additional chamber heating which is a result that may be undesirable in certain applications. The extent of the Boudouard reaction is dependent on temperature, meaning that higher temperatures produce more carbon monoxide.

The system model featured piping (flow streams) connecting individual components of the system. Piping sections were assumed to carry a mixture of compounds at the same temperature, total pressure, and flow rate. Pipe head loss and slip between solid and liquid compounds were not included. Compounds were assumed to have a constant specific heat across the temperature ranges of interest.

Each cell was modeled to be approximately 4 feet (1.22 m) long, 2.5 feet (0.76 m) tall, with a depth of 0.35 inches (0.89 cm). A total of 300 cells were required to generate the power output referenced below, which meant that the cell stack had a depth of almost 9 feet (2.74 m). These dimensions resulted in a total weight of the cell stack that may exceed 20 tons.

The thermodynamics and chemistry were uniquely defined for each component. The most critical of these was the DCFC stack, where electrical energy was generated. For a given set of system parameters, the model simulated steady state operation for a wide range of current densities. For each step, the current density was multiplied by the total cathode area to calculate total current. Four electrons are generated for every carbon atom consumed, and therefore, the current is directly proportional to carbon consumption. The remaining variables were then derived from carbon consumption, including air flow, carbonate formation, lift gas consumption, etc. Internal cell resistance was estimated from published data of existing DCFC prototypes.

The model included heat exchangers, which transfer heat from hot exhaust flows to cooler incoming flows. These function to limit the amount of heating required to maintain chamber temperatures. Heat exchangers are never 100% efficient; therefore each model included heat exchangers that were 85% efficient. This meant a maximum of 85% of the internal energy of the exhaust flow could be used to heat the incoming flow. The models also included heat loss to the immediate surroundings by conduction through chamber insulation. This gave insight into the physical size of insulation required to operate the system efficiently.

The cathode side of the DCFC cell stack 17 was supplied by fresh incoming air from the atmosphere. In addition to air, it is hypothesized that steam may also be required to assist oxygen reduction on the cathode electrode. It was assumed that two moles of water (steam) were required for every mole of oxygen reduced at the cathode.

Table 1 below lists the primary nominal parameter inputs that were used for the simulation. The cell was sized to produce approximately 22 kW at maximum efficiency under nominal conditions. The parameters in bold typeface were used in a sensitivity analysis study to determine how they affected overall performance.

TABLE 1

Nominal DCFC Model Parameters

| Parameter | Value |
| --- | --- |
| Open Cell Voltage OCV (V) | 1.02 |
| Cell Voltage at 100 mA/cm$^2$ (V) | 0.60 |
| Electrode Length (in) | 42.0 |
| Electrode Height (in) | 24.0 |
| Flow Field Depth (in) | 0.10 |
| Number of Cells (#) | 300 |
| Effective Cell Area (%) | 85.0% |
| Heat Exchanger Efficiency (%) | 85.0% |
| Steam Pump Efficiency (%) | 85.0% |
| Fuel Volatile Composition (wt %) | 25.0% |
| Fuel Ash Composition (wt %) | 3.0% |
| Carbon Utilization (%) | 95.0% |
| DC/AC Converter Efficiency (%) | 95.0% |
| Pulverizer Power Consumption (% of HHV) | 1.0% |
| Fuel HHV (MJ/kg) | 27 |
| Fuel Cost ($/kg) | $ 0.065 |
| NaOH Cost ($/kg) | $ 0.30 |
| Inlet Slurry Density (wt % NaOH/Carbon) | 0.50 |
| Cathode Air Flow | 1.50 |
| ($O_2$ actual/$O_2$ stoichiometric) | |
| Cathode Water Flow | 1.00 |
| ($H_2O$ actual/$H_2O$ stoichiometric) | |
| Lift Gas Flow | 2.00 |
| ($H_2O$ flow/Cathode Air Flow) | |
| Boudouard Reaction Ratio (CO/$CO_2$) | 0.20 |
| Carbonate Production Rate ($CO_3$/$CO_2$) | 0.01 |

Figure 16:
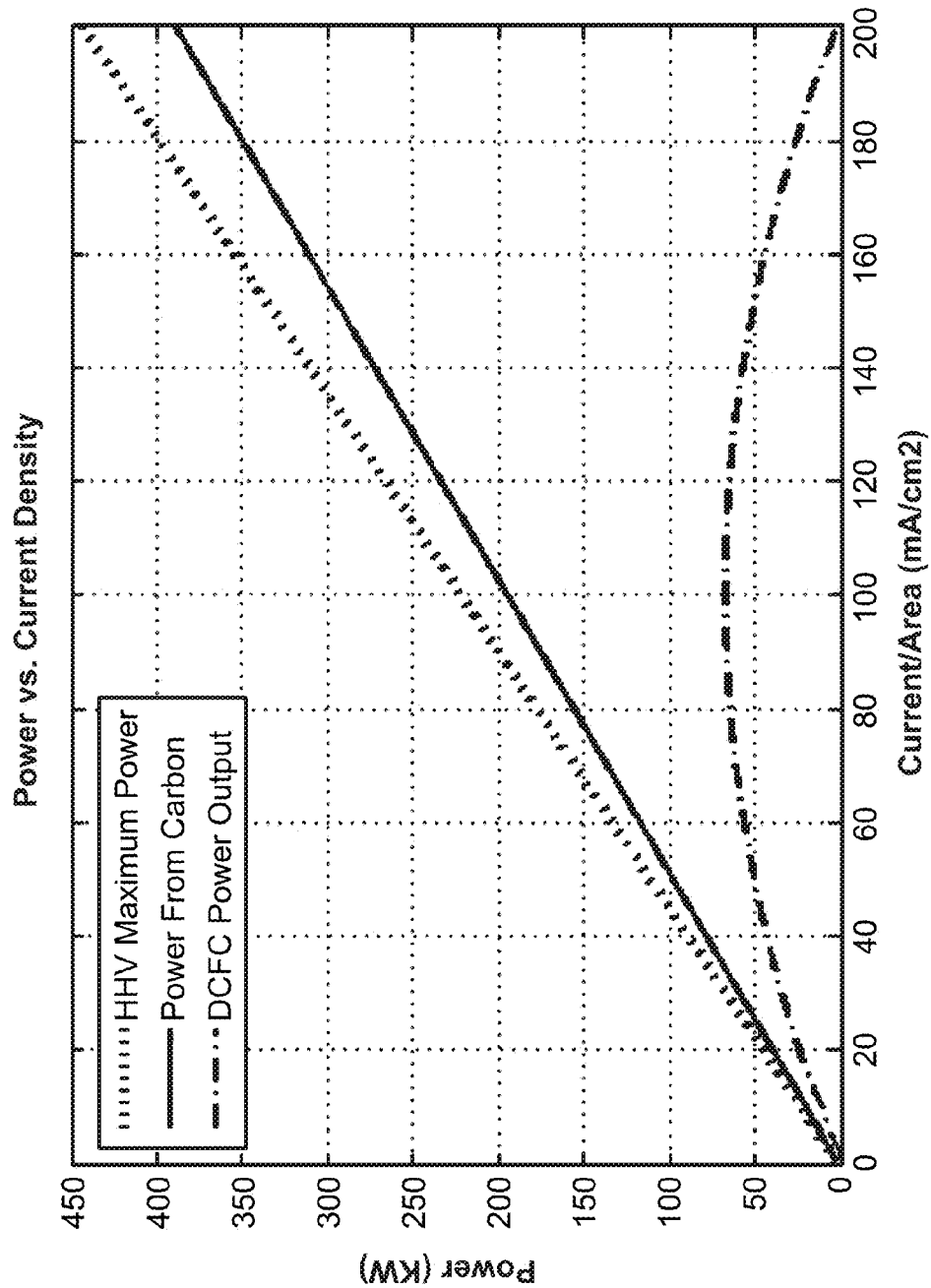
FIG. 16 is a graph illustrating power and current testing data pertinent to one or more aspects of the disclosure.

FIG. 16 illustrates three different power traces relative to cell current density. The linear dotted trace represents the theoretical Higher Heating Value (HHV) power available from the fuel entering the system. The solid black line indicates the amount of remaining power available after pyrolysis. The parabolic dotted trace represents the net AC electrical power output from the DCFC system. System efficiency was calculated by dividing DCFC power output by the total available HHV power of the fuel. As shown by the plot, ohmic losses from internal cell resistance reduce power output at high current densities.

Figure 17:
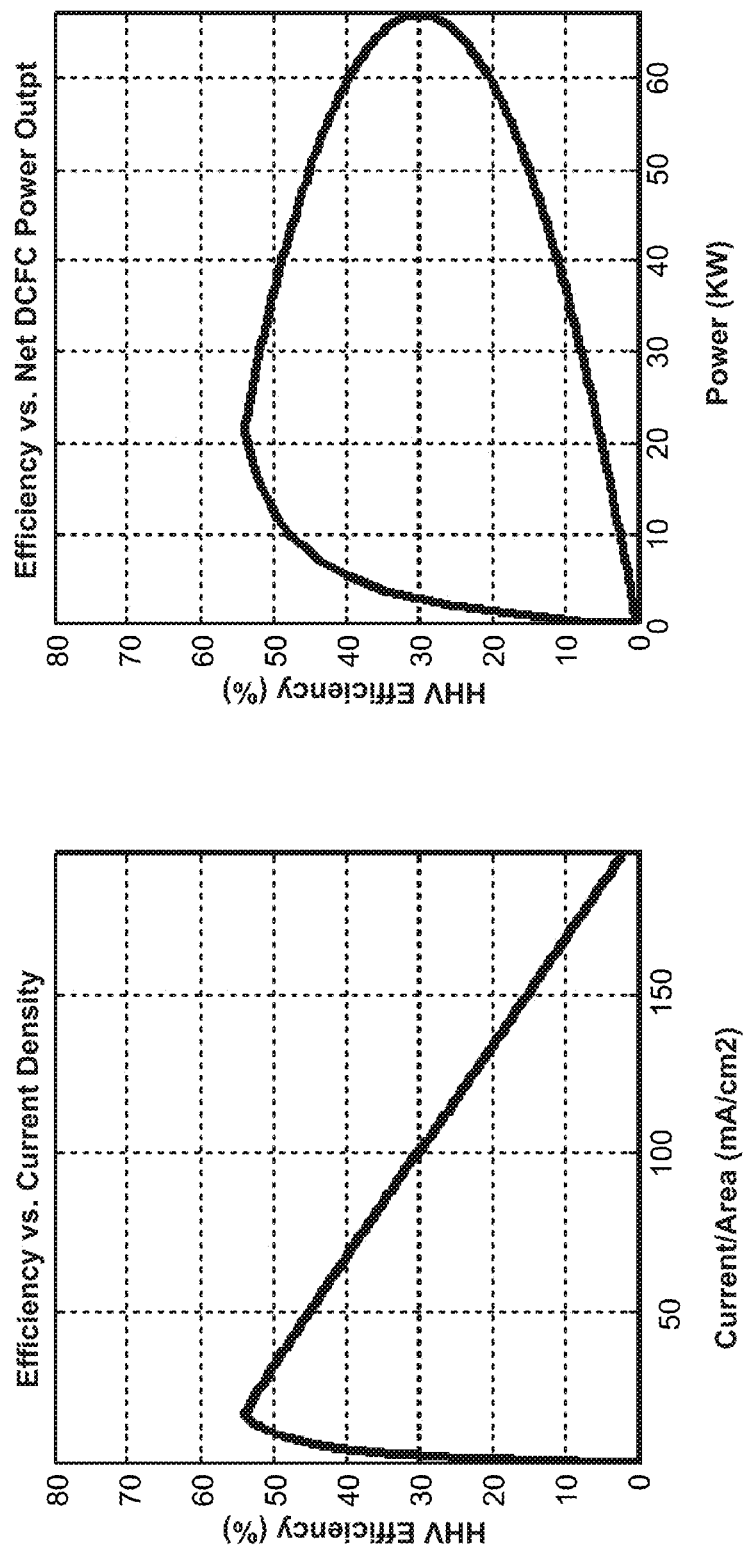
FIG. 17 is a graph illustrating efficiency as compared to current density and power output pertinent to one or more aspects of the disclosure.

FIG. 17 illustrates the results for total system efficiency relative to power output and current density. Operating at nominal parameters, the system could achieve a maximum efficiency of 54% at 22 kW. The maximum power output of the system was 67 kW, but the efficiency was reduced to 30%. The system could remain above 40% efficient from 5 to 60 kW.

The system appeared to be less efficient below 5 kW from thermal conduction losses through the surrounding insulation. Most of the power generated at low capacity was allocated to maintaining chamber temperatures. It is possible that thicker insulation would improve this result.

At high power output the efficiency was largely controlled by internal resistance losses of the cell ($P=I^2R$). It may be possible to improve this result by increasing electrode surface area, reducing ionic conduction length, or increasing electrolyte conductivity. The latter could be accomplished by increasing temperature or using a eutectic hydroxide mix of sodium, potassium, and lithium.

Figure 18:
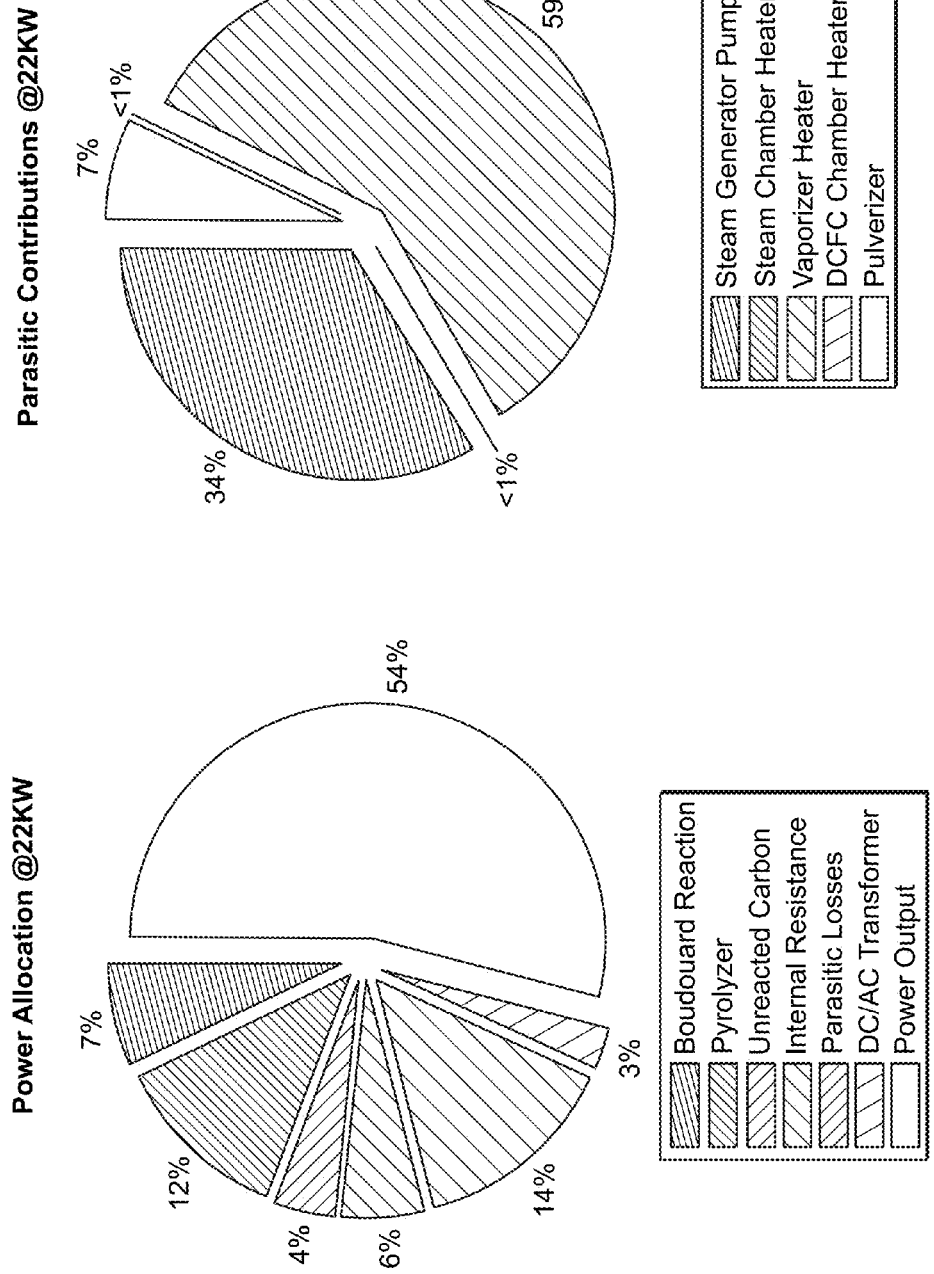
FIG. 18 is a graph illustrating the results from model testing pertinent to one or more aspects of the disclosure.

FIG. 18 shows the power distribution within the system at maximum efficiency. The pie chart on the left contains the total power divisions. It should be noted that the segment labeled "Parasitic Losses" (14% of the Power Allocation pie chart) contains all the elements of the pie chart on the right (Parasitic Contributions). The model indicated that 12% of the HHV of the fuel is lost through volatile off-gassing in the pyrolyzer, while 14% of the HHV was lost to parasitic sources, which were dominated by the vaporizer heater and steam generation pump.

Much of the heat generated by the vaporizer was recovered by the DCFC chamber, which explained why the DCFC Chamber Heater value was zero.

The model indicated that only 7% of the total HHE value was allocated to the Boudouard reaction. Without being bound by theory, one reason that may explain this drop is that two moles of carbon monoxide (CO) are produced for every mole of carbon used in the conversion.

A sensitivity analysis was performed on a subset of the system parameters mentioned above, including internal cell resistance, inlet slurry composition, cathode air flow rate, cathode steam flow rate, lift gas flow rate, Boudouard reaction ratio, and carbonate formation. For each tested parameter, all other parameters were held constant at their nominal value. The tested parameter was then varied across five values with the middle value being the nominal value. The range of values selected for each sensitivity analysis was specified to span a broad range of feasible values.

Parameter 1: Internal Resistance

Resistance was controlled by defining cell voltage at 100 mA/cm$^2$. Resistance values were varied from 0.4 V through 0.8 V at 100 mA/cm$^2$ with a nominal voltage of 0.6 V. The results indicated that internal cell resistance did not have a significant impact on overall system efficiency or power output at maximum efficiency. Despite the large range of values, system efficiency was only impacted by 5%. However, the maximum overall power output of the system was impacted by internal cell resistance. Across the settings, maximum power output changed from 45 kW to almost 125 kW. This indicated that capital costs, volume, and weight of the system may be significantly influenced by cell resistance.

Parameter 2: Inlet Slurry Composition

The inlet slurry ratio was defined as the mass ratio of sodium hydroxide to carbon entering the DCFC. Values were varied from 0.1 through 2.0 with a nominal value of 0.5. The results indicated that this parameter had a large impact on both efficiency and power output. System efficiency ranged from 34% to 58% and power output ranged from 26 kW to 80 kW. Without being bound by theory, this phenomenon may be entirely due to the high heat of vaporization for sodium hydroxide. Large ratios may mean that high volumes of sodium hydroxide would need to be processed by the vaporizer. Another option may be to reintroduce fresh carbon after the initial slurry has been partially reacted, which may have the same effect as a low initial slurry density ratio. This result also supports using the recirculating reactor with a siphon purge, as illustrated in FIG. 5. This concept may allow for continuous carbon addition without expending electrolyte for cleaning.

Parameter 3: Cathode Air Flow

Cathode air flow rates were varied from a 1:1 stoichiometric ratio through 2:1 with a nominal value of 1.5:1. The results indicated that this parameter did not have a large impact on efficiency or power output despite having relatively large flow rates and heat capacity. The heat exchangers built into the system model were able to effectively heat additional air entering the cathode.

Parameter 4: Cathode Steam Flow

Cathode steam flow rates were varied from zero through 2:1 relative to stoichiometric, with the nominal value at 1:1. As with airflow, increasing steam for the cathode did not have a large impact on system efficiency or power output. This may be due to the steam management system providing heat exchange between condensing and vaporizing water reservoirs. In addition, supplemental steam in the cathode may reduce cell resistance.

Parameter 5: Lift Gas Flow

Lift gas flow was defined as the mass ratio relative to the cathode air supply. The minimum value was 1:2 and the maximum was 8:1, with a nominal value at 2:1. Unlike cathode steam flow, the results indicated that high lift gas flow rates did have a noticeable impact on system efficiency and power output. A fourfold increase in lift gas flow over the nominal value caused efficiency to drop from 54% to 41%. In addition, maximum power output was reduced from 66 kW to 44 kW. This result also supports using the recirculating reactor with siphon purge because it may use less lift gas.

Parameter 6: Boudouard Reaction Ratio

Equilibrium values for the Boudouard reaction ratio ranged from 0.0 through 0.4 with the nominal value at 0.2. This ratio represented the moles of carbon monoxide over moles of carbon dioxide in the anode chamber. The results indicated that this ratio had a low to moderate effect on both efficiency and power output. Between minimum and maximum ratio values, efficiency only changed by approximately 8%. The calculated change in maximum power output was found to be even less than this value.

Parameter 7: Carbonate Production Rate

Carbonate formation rates were varied from 0.0 through 0.08 with a nominal value of 0.01. This ratio represented the moles of carbonate formed for every mole of carbon dioxide in the exhaust. The results indicated that very low carbonate formation rates did not have a significant impact on efficiency or power. However, high rates, such as 0.08, actually caused an increase in efficiency and power output. This impact may be because carbonate is removing sodium hydroxide from the system, which reduces the amount of sodium hydroxide being cleaned by the energy intensive vaporization process. In addition, carbon dioxide output was reduced.

The disadvantage of carbonate formation is that for every mole of carbonate formed, two moles of sodium hydroxide need to be replenished in the system. This represents a consumable, which may increase variable costs significantly since the market price for sodium hydroxide may be approximately five times the cost per weight of high-quality coal. Very high carbonate formation rates may cause the system to consume more sodium hydroxide than carbon fuel. This may also lead to a practical issue with having to continuously add sodium hydroxide throughout the operation. A practical DCFC system may need to operate at carbonate production rates of less than 0.005.

Simulation Conclusions

Table 2 below shows a qualitative summary of the sensitivity analysis presented above. The table is split into three columns that represent system parameters, including maximum achievable efficiency, maximum total power output, and the variable cost to produce a kWh of electricity. The results indicated that efficiency was most affected by inlet slurry density and lift gas flow rate. Internal cell resistance, carbonate production, and the Boudouard reaction were second-order effects. The maximum power output was most affected by cell resistance, but inlet slurry density and lift gas flow also had considerable impacts. Carbonate production may increase maximum power output, but there may also be a negative effect on variable cost per kWh. Cell resistance and lift gas flow rate also had noticeable impacts on variable cost.

TABLE 2

Sensitivity Analysis Results Summary

| Parameter | Effect on Maximum Efficiency | Effect on Maximum Power | Effect on Variable Cost |
|---|---|---|---|
| Cell Resistance | Moderate | Very High | High |
| Slurry Density | Very High | Very High | Very High |
| Air Flow | Very Low | Very Low | Very Low |
| Steam Flow | Negligible | Negligible | Negligible |

TABLE 2-continued

Sensitivity Analysis Results Summary

| Parameter | Effect on Maximum Efficiency | Effect on Maximum Power | Effect on Variable Cost |
|---|---|---|---|
| Lift Gas Flow | High | High | High |
| Boudouard Reaction | Moderate | Low | Low |
| Carbonate Production | Moderate | Moderate | Very High |

1—Negligible
2—Very Low
3—Low
4—Moderate
5—High
6—Very High

High lift gas flow rates may have negative effects on all system parameters. Many of the parameters in this model may be related. For example, increasing cell temperature may affect carbonate formation, cell resistance, and the Boudouard reaction.

Under nominal conditions, the system modeled in this study could achieve 54% HHV efficiency while generating 22 kW. Variable fuel cost at maximum efficiency was 1.9 cents per kWh, which may result in a 34% reduction over existing coal generated electricity. Maximum power output was 67 kW, with efficiency dropping to 30%.

Example 2

DCFC CAD Concepts

Figure 19:
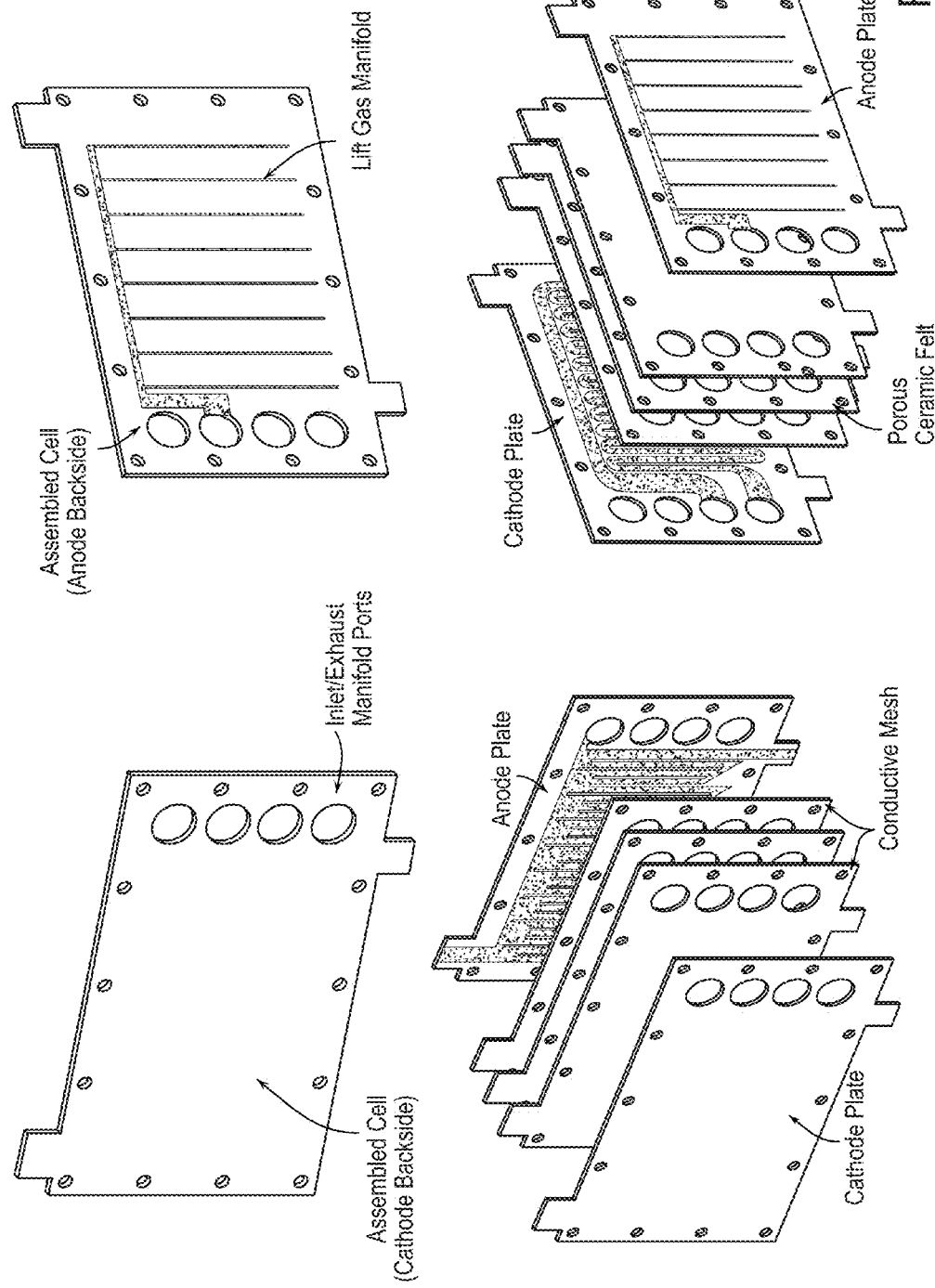
FIG. 19 is a diagram of a CAD model for a single cell pertinent to one or more aspects of the disclosure.

Preliminary CAD renderings of the system referenced above were generated. Additional cell level detail was added to illustrate flow field geometry and construction methods. FIG. 19 details a single cell assembly through multiple views, in both assembled and exploded configurations. Both anode and cathode flow field plates may be solid metal coated with a specialized ceramic layer, such as zirconium nitride. The anode and cathode flow field plates may also be a solid nickel or coated with gold. The center layer within the cell may be a thin layer of highly porous zirconium cloth. This may form a corrosion resistant ionic conduction layer that electrically insulates the anode and cathode. Finally, a thin, porous, metal mesh may separate the anode and cathode flow field plates on either side of the central zirconium cloth. Each mesh layer may be welded or sintered to its respective flow field plate.

Multiple cells may be clamped together in series to form a cell stack. Compression forces around the perimeter of the cell plate may locally crush the zirconium membrane creating a liquid seal. This may serve to keep the molten hydroxide contained in the anode compartment. Additional ceramic cement or crushable features may be required if the process is prone to leaks.

Figure 20:
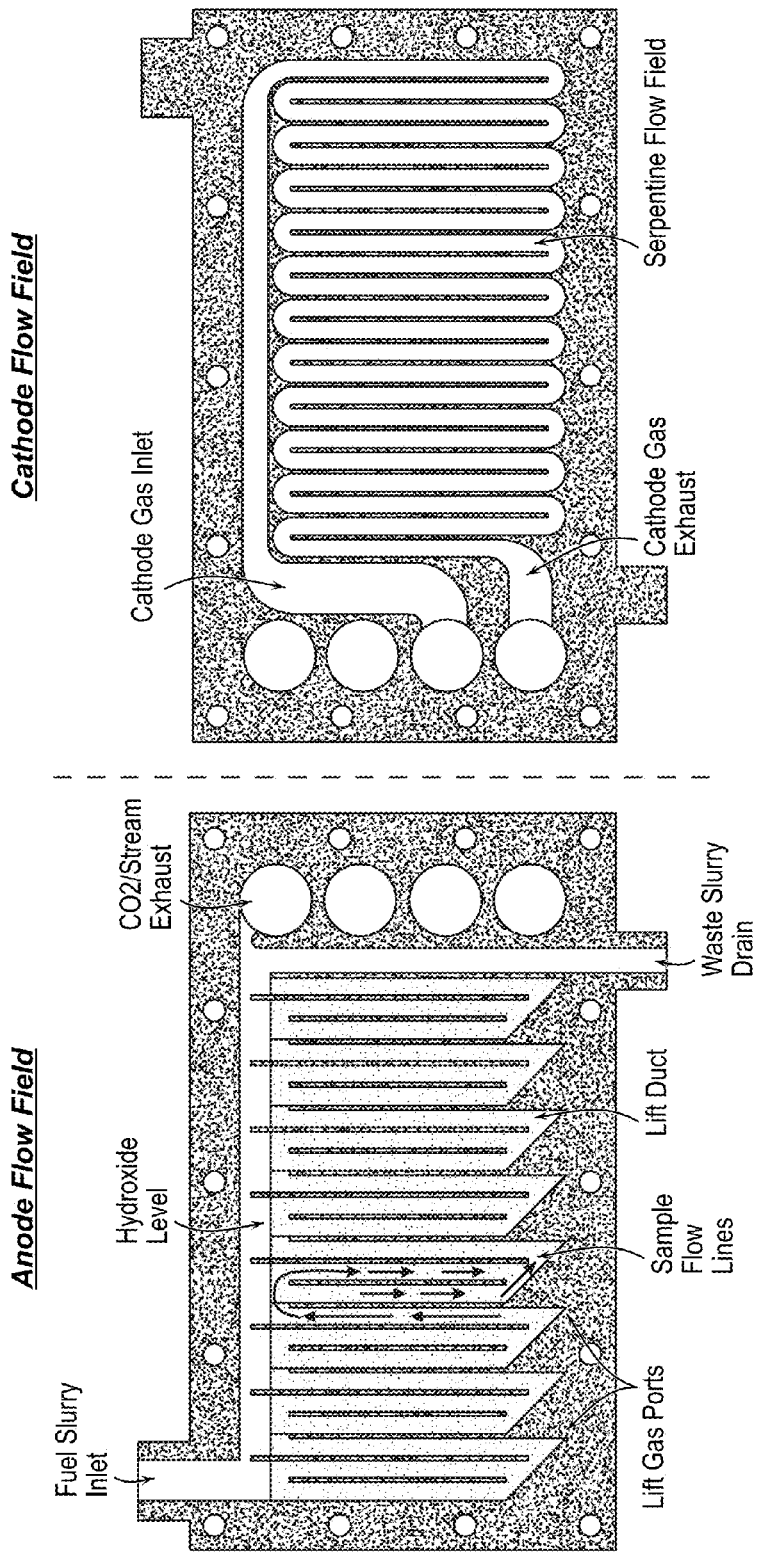
FIG. 20 is a diagram of a CAD model of cathode and anode plates pertinent to one or more aspects of the disclosure.

FIG. 20 shows detail of the anode and cathode flow field geometries. The cathode (right side) features a serpentine flow field transporting fresh air and steam to one side of the cell. The anode (left side) contains shaded portions that represent the carbon and sodium hydroxide slurry. The air head space above the liquid in the anode chamber may be a combination of steam, carbon dioxide, and trace amounts of carbon monoxide. Lift gas steam ports are small holes that may be located at the bottom of each tetrahedral column. The supply manifold for the lift gas may be machined in the back side of the anode plate. This can be viewed in the upper right panel of FIG. 19. These illustrations are intended to demonstrate the general flow of materials through each cell compartment. They may also provide an approximation for the volume of material required to produce a cell of the referenced size. For reference, the plates in these illustrations measure 4 feet (1.22 m) in length by 2.5 feet (0.76 m) in height. The total stack thickness is slightly less than ⅜ inch (0.95 cm).

Figure 21:
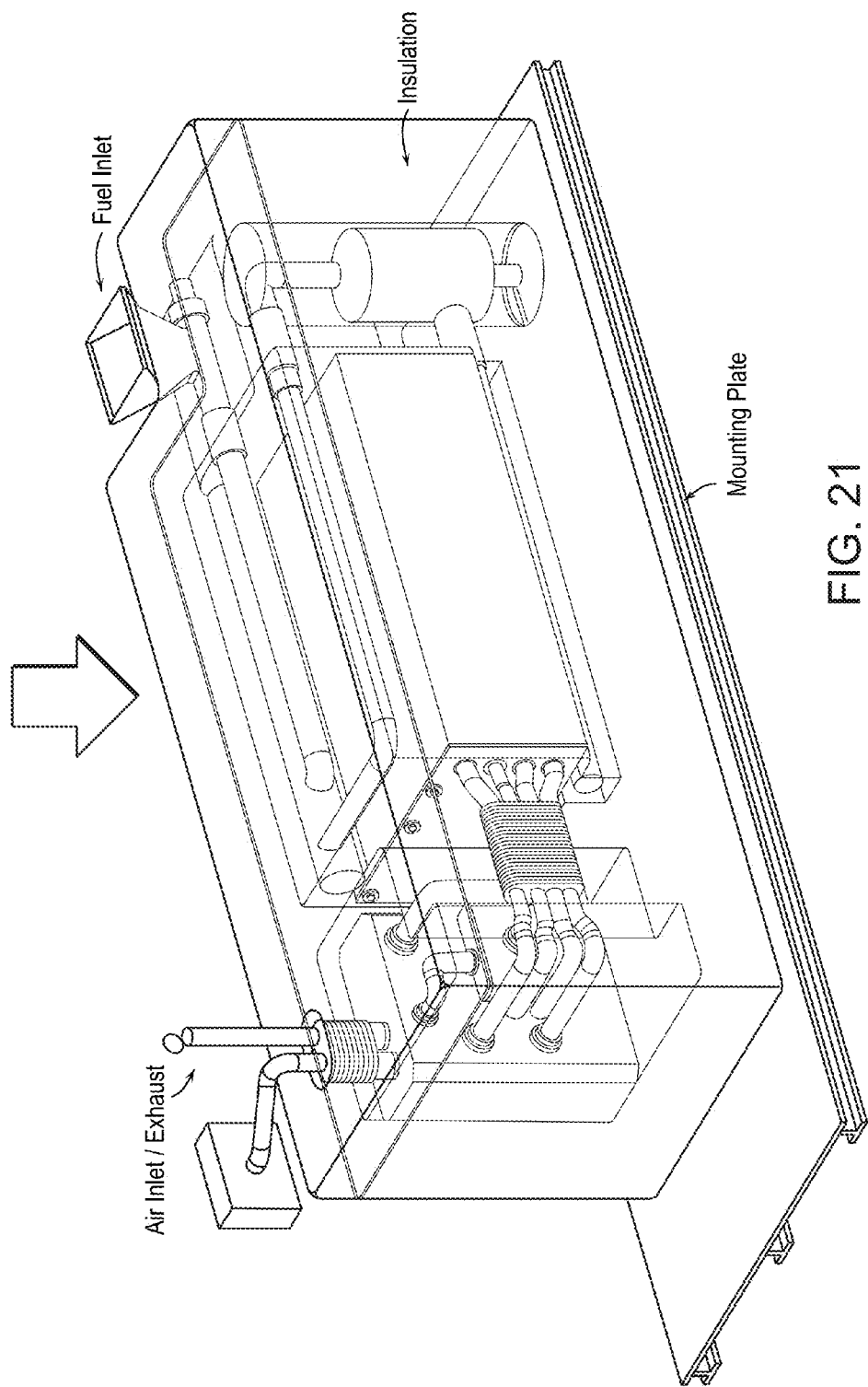
FIG. 21 is an illustration of a DCFC system pertinent to one or more aspects of the disclosure.
Figure 22:
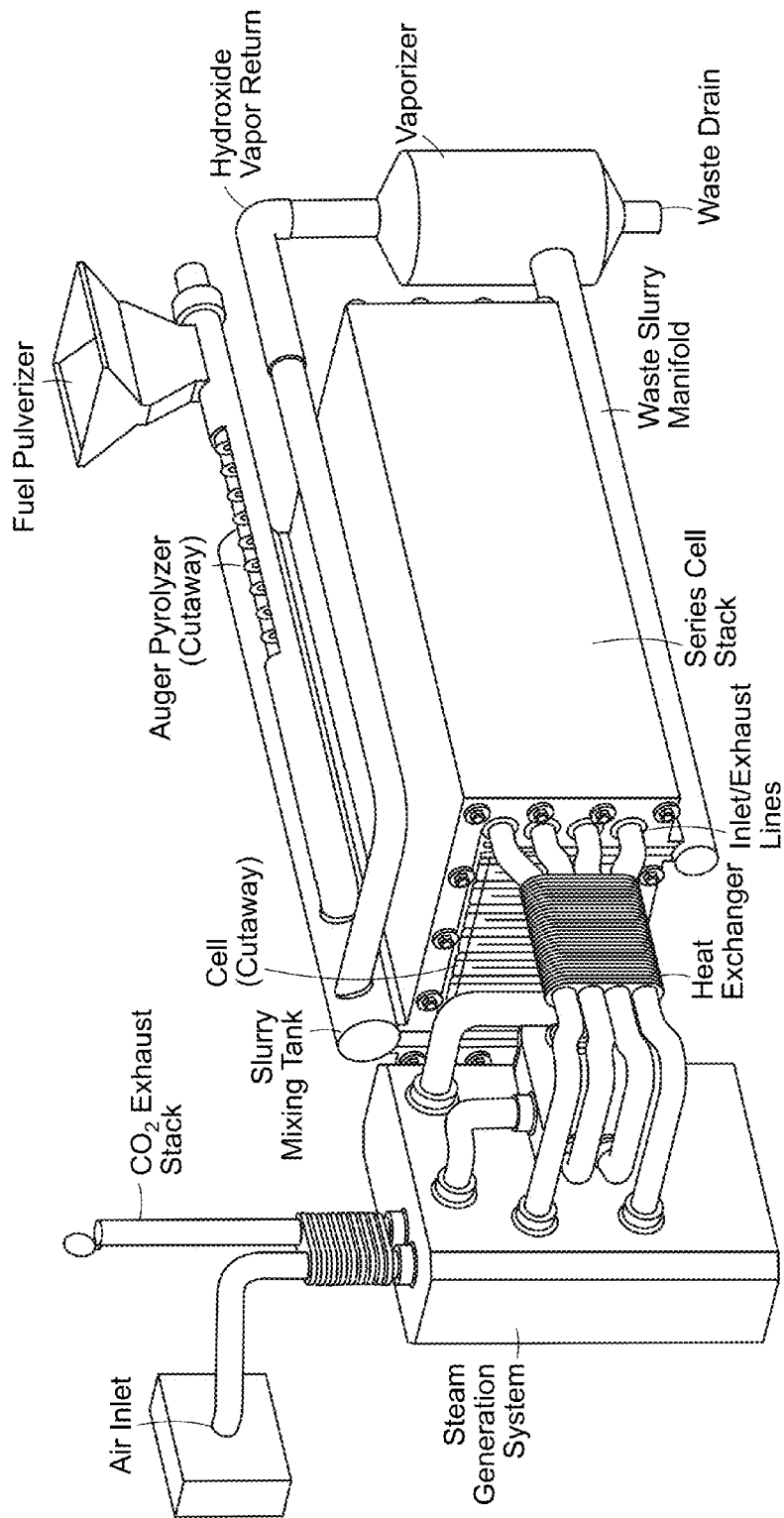
FIG. 22 is an illustration of a DCFC system pertinent to one or more aspects of the disclosure.
Figure 23:
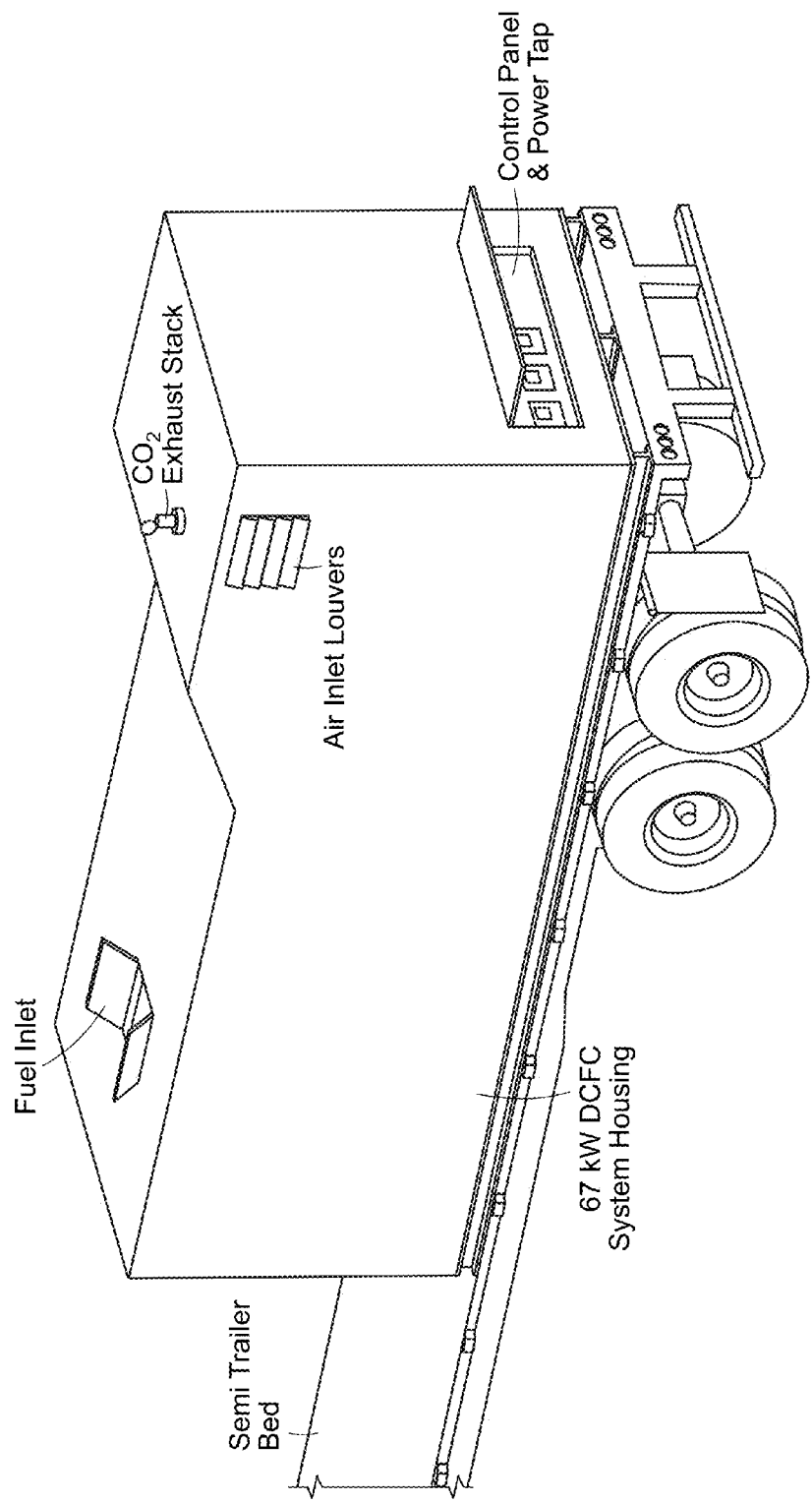
FIG. 23 is an illustration of a DCFC system pertinent to one or more aspects of the disclosure.

FIG. 21 shows a three-dimensional rendering of the system illustrated in FIG. 14. As shown in the figure, the DCFC stack is quite large, extending almost 9 feet (2.74 m). The figure also shows the vaporizer, fuel pyrolyzer, steam generation system, and fuel pulverizer. FIG. 22 shows additional detail and component annotations of the DCFC system illustrated in FIG. 14. FIG. 23 depicts the DCFC system located on a standard tractor-trailer bed. In this layout, the additional space on a trailer may be used to hold and process organic fuels such as wood or switch grass.

Example 3

Materials Testing

Materials for electrode construction may need to be highly resistant to corrosion while maintaining electrical conductivity on the surface. Pure nickel may perform moderately in molten sodium hydroxide, but may suffer from oxidizing deterioration and sulfur contamination. Other metals and alloys noted for their superior corrosion resistance at high temperatures include Stainless Steel 316L, Titanium grade 4, Hastelloy X, Alloy 600 (Inconel 600), and Nickel 200/201. Each of these materials was tested for corrosion resistance.

FIG. 24 shows an illustration of the test apparatus used to evaluate metal corrosion resistance in sodium hydroxide at 600° C. High form Alumina crucibles were used to contain the molten sodium hydroxide and metal coupon. The backside of each coupon was given a textured surface using a fly cutter. Two coupons were machined for each of the five materials tested. In addition, a thin unsintered Nickel 200 mesh was tested to measure the effect of changing surface area to volume ratios.

Before testing, each coupon was subjected to a series of baseline tests. These included weight measurements, thickness measurements, visual imaging, Scanning Electron Microscope (SEM) imaging, EDS surface scanning, and electrical contact resistance. One set of samples was placed into individual alumina crucibles filled with 10 g of sodium hydroxide. The second set of samples performed as control samples and was placed in open air next to the alumina crucibles.

The samples were then placed in an oven and brought to 600° C. for slightly over 24 hours. The samples were then allowed to cool down over 12 hours and then extracted from the oven. The control samples were immediately subjected to SEM imaging. The sodium hydroxide samples were placed in deionized water for three days to dissolve away the sodium hydroxide and expose the buried metal coupon. The samples were then rinsed three times to remove any sodium hydroxide on the surface. Three of the tested materials are discussed below.

Material 1: Stainless Steel 316L

The results indicated that Stainless Steel 316L showed poor performance. The sample was heavily deteriorated with obvious oxidation. Actual portions of the sample were missing and oxide residue continuously fell from the sample during handling. The sample experienced a heavy loss of material at the edge of the textured side and there was a clear formation of oxide on the once smooth surface as well as a layering and cracking phenomenon.

EDS surface scan results indicated that prior to sodium hydroxide exposure, there were high levels of iron, chromium, and nickel, which were consistent with the chemical composition of 316L. The EDS surface scan results after exposure indicated that much of the surface was covered with iron, oxygen, and sodium. These results may indicate a layer of iron oxide and sodium oxide covering the surface.

Material 2: Nickel

Results from the nickel sample indicated a clear black discoloration, but the geometry and surface finish were relatively unaffected. The identifying numbers were still apparent along with the texturing on the coupon. The smooth surface remained relatively smooth after exposure to the sodium hydroxide. There was evidence of a slight oxide build-up, and the surface landscape of the textured side was also reasonably preserved. There did appear to be a smoothing, or etching, which may be from the low-level oxidation.

EDS scanning results showed evidence of nickel oxide formation on the surface. There also appeared to be traces of sodium on the surface, but this may be attributed to trace sodium hydroxide that was removed by the rinsing process, and was at a level much lower than present in the other samples.

Of the five materials tested, the nickel sample performed best, but still suffered from moderate levels of oxidation. It may be possible for sulfur to form nonconductive compounds on the surface under processing conditions.

The unsintered nickel mesh material completely transformed to nickel oxide powder within 24 hours when placed in sodium hydroxide. The results indicated that the nickel oxide layer either extended far into the surface or continually eroded the material.

Material 3: Titanium

The control titanium sample performed extremely well and demonstrated the most corrosion resistance of any of the tested control materials. However, the sample submerged in sodium hydroxide was completely transformed into a porous sponge that was most likely titanium oxide.

Material 4: Ceramic Coated Metals (ZrN, AlN and CrN)

A separate experiment was conducted using several different ceramic coatings on nickel. Zirconium nitride, aluminum nitride, and chromium nitride on nickel were exposed to the same testing conditions in sodium hydroxide. The test results from the aluminum nitride sample indicated that the coating was completely removed and the sample experienced a loss in weight. The test results from the chromium and zirconium nitride samples indicated the formation of a heavy oxide layer and the samples experienced a gain in weight (approximately 0.37% for the ZrN in an 11 day time period). Overall, the oxide layers did not exhibit good adhesion to the surface and eventually sloughed off. Repeated friction from the carbon-electrolyte slurry may result in cleaning the surface of the nickel to the point where it erodes away completely.

Conclusion

In summary, it was found that pure nickel performed the best in molten sodium hydroxide. Despite promising results with the solid sample, testing of the unsintered mesh indicated that the performance of nickel may not be sustainable over long periods of operation in sodium hydroxide.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority.

Those skilled in the art would readily appreciate that the various parameters and configurations described herein are meant to be exemplary and that actual parameters and configurations will depend upon the specific application for which the systems and methods directed toward DCFC systems and processes of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a treatment process using a DCFC system. It is, therefore, to be understood that the foregoing embodiments are presented by way of example only and that, within the scope of the appended claims and equivalents thereto, the disclosed DCFC systems and methods may be practiced otherwise than as specifically described. The present systems and methods are directed to each individual feature or method described herein. In addition, any combination of two or more such features, systems or methods, if such features, systems or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise DCFC processes and systems. Accordingly, the foregoing description and drawings are by way of example only. Further, the depictions in the drawings do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A method of cleaning a direct carbon fuel cell chamber, the method comprising:
   introducing a carbon and an electrolyte into a mixing tank to generate a carbon-electrolyte slurry;
   introducing the carbon-electrolyte slurry at a first flow rate into the direct carbon fuel cell chamber through a first siphon loop when the carbon-electrolyte slurry reaches a predetermined level in the mixing tank; and
   removing an at least partially expended carbon-electrolyte slurry from the direct carbon fuel cell chamber at a second flow rate through a second siphon loop when the at least partially expended carbon-electrolyte slurry reaches a predetermined level in the direct carbon fuel cell chamber, wherein the first flow rate is slower than the second flow rate.

2. The method of claim 1, further comprising controlling the first flow rate by allowing a fluid level in the first siphon loop to reach a predetermined level at a height greater than the predetermined level in the mixing tank.

3. The method of claim 2, further comprising controlling the first flow rate by providing a first cross-sectional area at a predetermined value to the first siphon loop.

4. The method of claim 1, further comprising using gravity to introduce the carbon-electrolyte slurry into the direct carbon fuel cell chamber.

5. The method of claim 1, further comprising controlling the second flow rate by allowing a fluid level in the second siphon loop to reach a predetermined level at a height greater than the predetermined level in the direct carbon fuel cell chamber.

6. The method of claim 5, further comprising controlling the second flow rate by providing a second cross-sectional area at a predetermined value to the second siphon loop.

7. The method of claim 1, further comprising controlling the first and second flow rates by providing the first siphon loop with a first cross-sectional area and the second siphon loop with a second cross-sectional area, the first cross-sectional area at a value that is smaller than the second cross-sectional area.

8. The method of claim 1, further comprising introducing the at least partially expended carbon-electrolyte slurry from the second siphon loop into a cleaning system to produce recycled electrolyte.

9. The method of claim 8, further comprising using gravity to introduce the at least partially expended carbon-electrolyte slurry into the cleaning system.

10. The method of claim 9, further comprising introducing at least a portion of the recycled electrolyte into the mixing tank.

* * * * *